US012700919B2

(12) United States Patent
Cheng

(10) Patent No.: US 12,700,919 B2
(45) Date of Patent: Aug. 4, 2026

(54) DEVICE AND METHOD OF HANDLING MOBILITY

(71) Applicant: ACER INCORPORATED, New Taipei City (TW)

(72) Inventor: Ching-Wen Cheng, New Taipei City (TW)

(73) Assignee: ACER INCORPORATED, New Taipei City (TW)

( * ) Notice: Subject to any disclaimer, the term of this patent is extended or adjusted under 35 U.S.C. 154(b) by 930 days.

(21) Appl. No.: 17/511,591

(22) Filed: Oct. 27, 2021

(65) Prior Publication Data

US 2022/0140892 A1 May 5, 2022

Related U.S. Application Data

(60) Provisional application No. 63/107,453, filed on Oct. 30, 2020.

(51) Int. Cl.
H04W 36/36 (2009.01)
H04B 7/185 (2006.01)
(Continued)

(52) U.S. Cl.
CPC .... H04B 7/18547 (2013.01); H04W 36/0061 (2013.01); H04W 36/0072 (2013.01);
(Continued)

(58) Field of Classification Search
CPC ......... H04W 36/0061; H04W 36/0072; H04W 36/0079; H04W 36/023; H04W 36/08;
(Continued)

(56) References Cited

U.S. PATENT DOCUMENTS

2011/0039552 A1    2/2011   Narasimha
2014/0023045 A1*   1/2014   Li ..................... H04W 36/0058
                                                         370/331
(Continued)

FOREIGN PATENT DOCUMENTS

WO        2012/093902 A2    7/2012
WO        2016/013329 A1    1/2016
(Continued)

OTHER PUBLICATIONS

3rd Generation Partnership Project; Technical Specification Group Radio Access Network; NR; NR and NG-RAN Overall Description; Stage 2 (Release 16), Technical Specification, Sep. 2020, pp. 1-148, 3GPP TS 38.300 V16.3.0, 3rd Generation Partnership Project, XP051961311, Sep. 2020.
(Continued)

*Primary Examiner* — Jeanette J Parker
*Assistant Examiner* — Dung L Lam
(74) *Attorney, Agent, or Firm* — Winston Hsu

(57) ABSTRACT

A method of handling mobility of a communication device for a cell of a base station. The method comprising configuring a proxy cell for a communication device; and transmitting a mobility configuration comprising information of the proxy cell and at least one candidate cell to the communication device; wherein the proxy cell stores information of a user plane, information of a control plane, or data associated with the communication device.

17 Claims, 23 Drawing Sheets

(51) Int. Cl.

| | | |
|---|---|---|
| *H04W 36/00* | (2009.01) | |
| *H04W 36/02* | (2009.01) | |
| *H04W 36/30* | (2009.01) | |
| *H04W 36/32* | (2009.01) | |
| *H04W 36/08* | (2009.01) | |

(52) U.S. Cl.
CPC ..... *H04W 36/0079* (2018.08); *H04W 36/023* (2013.01); *H04W 36/302* (2023.05); *H04W 36/326* (2023.05); *H04W 36/36* (2013.01); *H04W 36/08* (2013.01)

(58) Field of Classification Search
CPC . H04W 36/302; H04W 36/326; H04W 36/36; H04B 7/18547
See application file for complete search history.

(56) References Cited

U.S. PATENT DOCUMENTS

| | | |
|---|---|---|
| 2014/0341182 A1 | 11/2014 | Gage |
| 2016/0323800 A1 | 11/2016 | Ulupinar |
| 2022/0070670 A1* | 3/2022 | Wu ..................... H04W 12/106 |
| 2022/0338090 A1* | 10/2022 | Wang ................. H04W 36/328 |

FOREIGN PATENT DOCUMENTS

| | | |
|---|---|---|
| WO | 2020/034329 A1 | 2/2020 |
| WO | 2020/090440 A1 | 5/2020 |
| WO | 2020/119404 A1 | 6/2020 |
| WO | 2020/149650 A1 | 7/2020 |
| WO | 2020/164365 A1 | 8/2020 |

OTHER PUBLICATIONS

3rd Generation Partnership Project; Technical Specification Group Radio Access Network; NR; Medium Access Control (MAC) protocol specification (Release 16), Technical Specification, Sep. 2020, pp. 1-154, 3GPP TS 38.321 V16.2.1, 3rd Generation Partnership Project, XP051961393, Sep. 2020.

3rd Generation Partnership Project; Technical Specification Group Radio Access Network; Solutions for NR to support non-terrestrial networks (NTN) (Release 16), Technical Report, Dec. 2019, pp. 1-143, 3GPP TR 38.821 V1.1.0, 3rd Generation Partnership Project, XP051838792, Dec. 2019.

Interdigital Inc., Mobility Enhancements for Non-Terrestrial Networks, 3GPP RAN WG2 Meeting #106, R2-1908245, May 13-May 17, 2019, Reno, United States, XP051740398.

ITRI, Discussion on signaling and data transmission issues of NTN CHO, 3GPP TSG-RAN WG2 Meeting #116-e, R2-2110283, Online, Nov. 1-12, 2021, XP052066727.

3GPP, 3GPP TR 38.821 V16.0.0 (Dec. 2019); 3rd Generation Partnership Project; Technical Specification Group Radio Access Network; Solutions for NR to support non-terrestrial networks (NTN) (Release 16), 3GPP, Dec. 2019.

Ericsson, Connected mode aspects for NTN, 3GPP TSG-RAN WG2 Meeting #112 electronic, R2-2009821, pp. 1-10, Online, Nov. 2-13, 2020.

* cited by examiner

DEVICE AND METHOD OF HANDLING MOBILITY

CROSS REFERENCE TO RELATED APPLICATIONS

This application claims the benefits of U.S. Provisional Application No. 63/107,453, filed on Oct. 30, 2020, which is incorporated herein by reference.

BACKGROUND OF THE INVENTION

1. Field of the Invention

The present invention relates to a device and a method used in a wireless communication system, and more particularly, to a device and a method of handling mobility.

2. Description of the Prior Art

A source cell of a source BS may determine to initiate a mobility procedure of a user equipment (UE) to a first target cell of a first target BS. However, there may be a long distance between the source BS and the first target BS. Accordingly, a transmission delay may result from the long distance, when the first target cell of the first target BS intends to retrieve data of the UE from the source cell of the source BS. Thus, the mobility procedure of the UE between the source cell and the first target cell may be performed inefficiently.

In addition, the UE may determine a second target cell of a second target BS and perform the mobility procedure to the second target cell, e.g., based on measured signal strength and/or signal quality of neighbor cell(s), when the UE is configured with at least one candidate cell by the source cell of the source BS. The second target cell may not be one of the at least one candidate cell.

The third Generation Partnership Project (3GPP) standard specifies communications between non-terrestrial networks (NTN) and UEs complying with fifth generation (5G) new radio access network (5G-NR). An NTN, as opposite to a terrestrial network (TN), is implemented with NTN nodes such as a satellite, an unmanned aerial system (UAS) access node, a high altitude platform station (HAPS), etc. An NTN cell may be served by one or more of the satellite beam footprint coverage (i.e., the coverage of a satellite beam on the ground) which may cover a wide range of area on the ground.

The coverage of an NTN cell may be far greater than the coverage of a TN cell, more than one TN cell overlapped with a NTN cell may use the same cell identity (ID), or even a cell ID of the target cell and a cell ID of the source cell may be reused when it is a mobility between the NTN and the TN.

When the second target cell is one of the candidate cell configured by the source cell, the second target cell may uniquely identify the source cell even the cell ID of the source cell and the target cell are reused. However, when the second target cell is determined by the UE and is not one of the candidate cell configured by the source cell, the second target cell may not be able to uniquely identify the source cell if the cell ID is used by more than one cell.

Accordingly, the second target cell may not uniquely identify the source cell. Thus, the mobility procedure of the UE between the source cell and the second target cell may not be performed properly.

Thus, how to handle the mobility is an important problem to be solved.

SUMMARY OF THE INVENTION

The present invention therefore provides a method and related communication device for handling mobility to solve the abovementioned problem.

A method of handling mobility of a communication device for a cell of a base station. The method comprising configuring a proxy cell for a communication device; and transmitting a mobility configuration comprising information of the proxy cell and at least one candidate cell to the communication device; wherein the proxy cell stores information of a user plane, information of a control plane, or data associated with the communication device.

A communication device for handling mobility comprising at least one storage device and at least one processing circuit, coupled to the at least one storage device, wherein the at least one storage device stores instructions, and the at least one processing circuit is configured to execute the instructions of: receiving a mobility configuration comprising information of a proxy cell and at least one candidate cell from a cell of a base station (BS); performing a mobility procedure to change the cell to a first target cell according to the mobility configuration; performing a determination on whether the first target cell is one of the at least one candidate cell according to the mobility configuration; and transmitting a first connection establishment message to the first target cell according to the determination.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
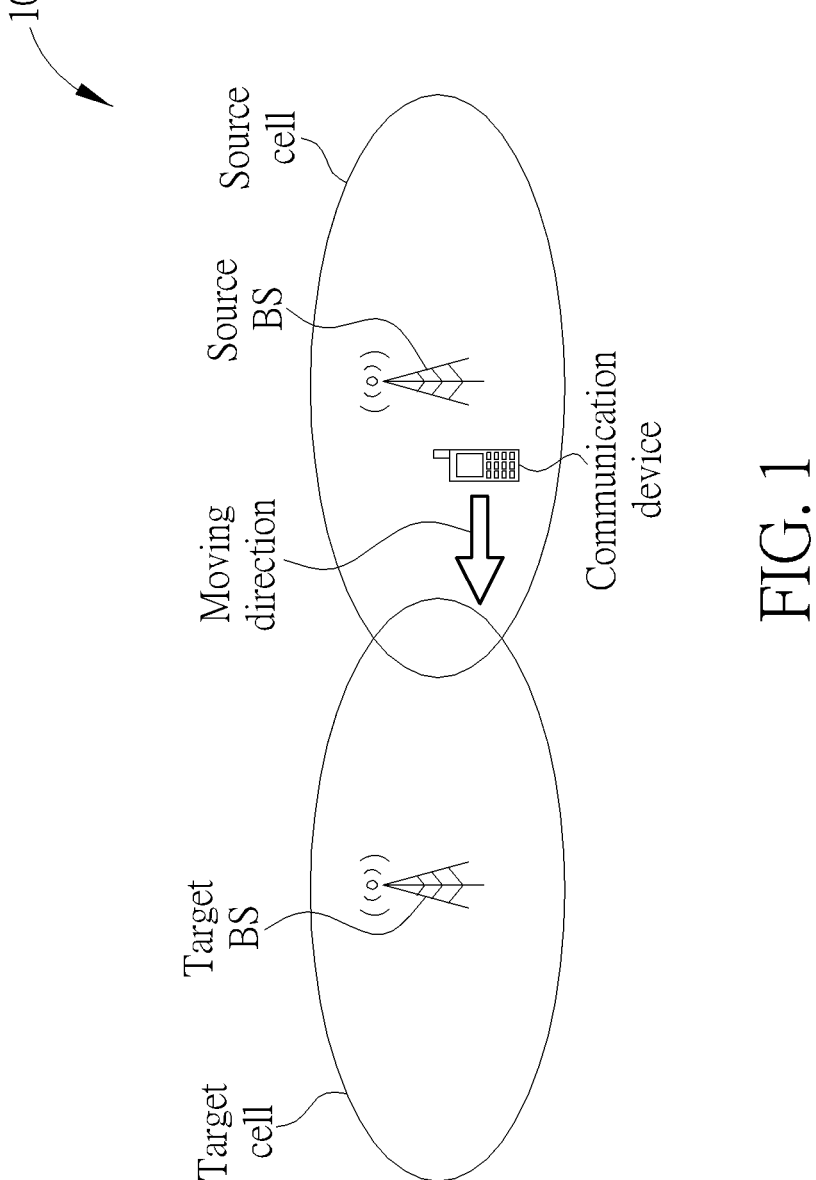
FIG. 1 is a schematic diagram of a wireless communication system according to an example of the present invention.

FIG. 1 is a schematic diagram of a wireless communication system 10 according to an example of the present invention. The wireless communication system 10 is briefly composed of a source base station (BS), a target BS and a communication device. A coverage area of the source BS may include a source cell. The source BS and the communication device may communicate with each other via the source cell. A coverage area of the target BS may include a target cell. The target BS and the communication device may communicate with each other via the target cell. The coverage area of the source BS and the coverage area of the target BS may overlap (e.g., partially or completely).

In FIG. 1, part of the source cell overlaps with the target cell. The communication device moves from the source cell to the target cell according to a moving direction. The source cell of the source BS may hand over the communication device to target cell of the target BS according to a network configuration, a preference of the communication device, a measurement report of the communication device or a location of the communication device. The network configuration may be determined according to (e.g., by using) an operator policy. The communication device preference may be indicated in capability parameters of the communication device. The measurement report of the communication device may be generated (e.g., calculated) by the communication device and obtained from the communication device. The location of the communication device may be obtained according to (e.g., by using) a location information report of the communication device.

In FIG. 1, the source cell, the source BS, the target cell, the target BS and the communication device are simply utilized for illustrating the structure of the wireless communication system 10. Practically, the source BS and the target BS may belong to a terrestrial network (TN). The TN may include a universal terrestrial radio access network (UTRAN) including at least one Node-B (NB) in a universal mobile telecommunications system (UMTS), an evolved UTRAN (E-UTRAN) including at least one evolved NB (eNB) and/or at least one relay node in a long term evolution (LTE) system, a LTE-Advanced (LTE-A) system, an evolution of the LTE-A system, etc., or a next generation radio access network (NG-RAN) including at least one next generation Node-B (gNB) and/or at least one fifth generation (5G) BS. That is, the communication device moves from a coverage area of the TN BS (i.e., the source BS is the TN BS) to a coverage area of the TN BS (i.e., the target BS is the TN BS) according to the moving direction. The distance between the coverage area of the TN BSs may be around (e.g., greater or equal to) 3 kilometer (km).

The source BS and the target BS may belong to a non-terrestrial network (NTN). The NTN may include a satellite on a geosynchronous equatorial orbit (GEO), a medium earth orbit (MEO) or a low earth orbit (LEO) acting as a relay node or a carrier embarked the functional components of a BS, for forwarding a signal received from the source BS (via a satellite signal transceiver) or transmitting a signal generated by the source BS to the communication device or for forwarding/transmitting a wireless signal received from the communication device to the source BS (via the satellite signal transceiver). That is, the communication device moves from a coverage area of a first NTN cell of the NTN BS (i.e., the source BS is the NTN BS) to a coverage area of a second NTN cell of the NTN BS (i.e., the target BS is the NTN BS) according to the moving direction.

The source BS may belong to the TN and the target BS may belong to the NTN. That is, the communication device moves from a coverage area of a first cell of the TN BS (i.e., the source BS is the TN BS) to a coverage area of a second cell of the NTN BS (i.e., the target BS is the NTN BS) according to the moving direction.

The source BS may belong to the NTN and the target BS may belong to the TN. That is, the communication device moves from a coverage area of a first cell of the NTN BS (i.e., the source BS is the NTN BS) to a coverage area of a second cell of the TN BS (i.e., the target BS is the TN BS) according to the moving direction. The diameter of the coverage area of the NTN cell may be ranged from tens to hundreds kilometers (km) (e.g., around 30 to 200 km).

Figure 2:
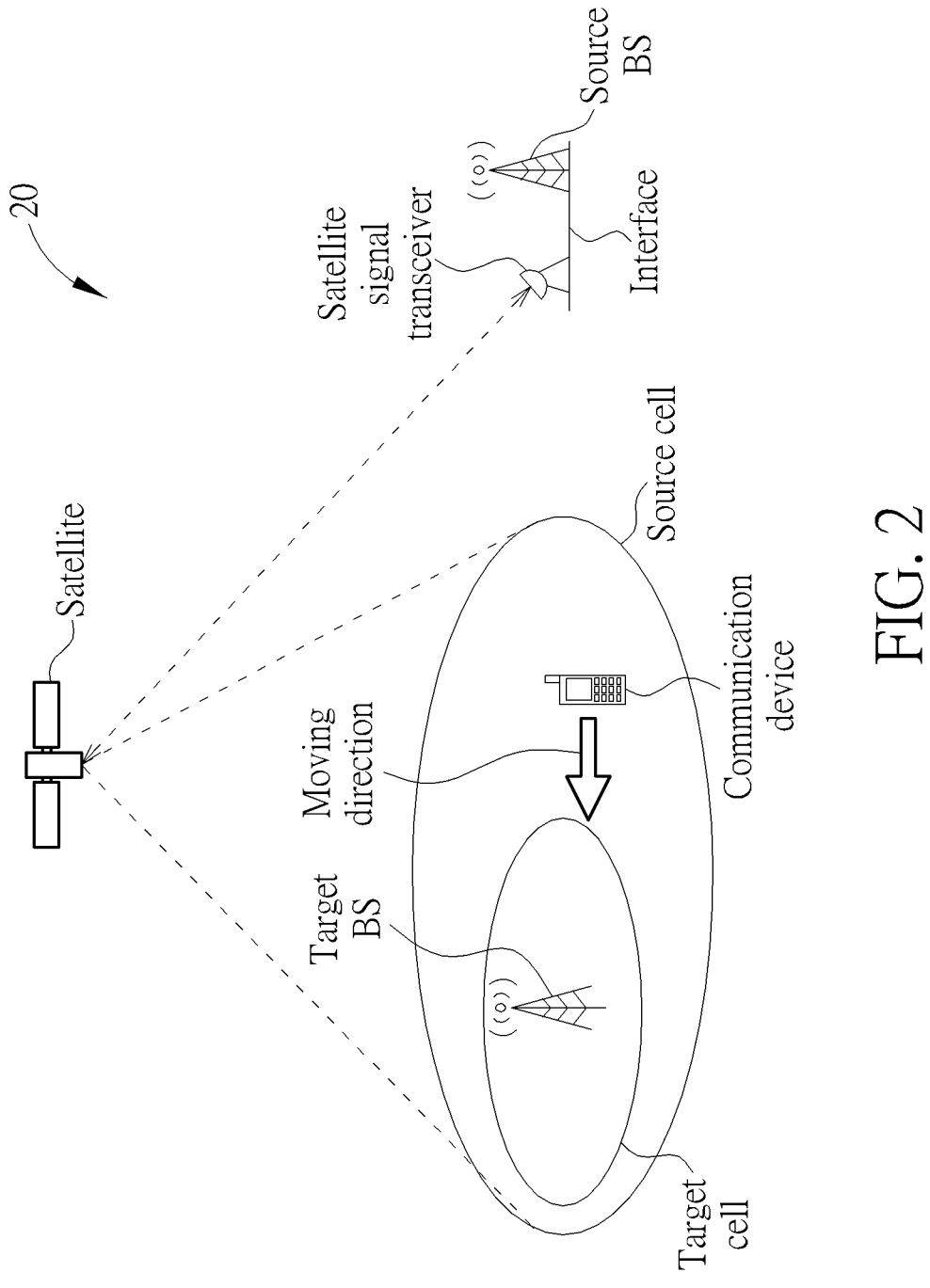
FIG. 2 is a schematic diagram of a wireless communication system according to an example of the present invention.

FIG. 2 is a schematic diagram of a wireless communication system 20 according to an example of the present invention. The wireless communication system 20 may be applied to the wireless communication system 10 in FIG. 1. The wireless communication system 20 is briefly composed of a source BS, an interface, a satellite signal transceiver, a satellite, a target BS and a communication device. A coverage area of the source BS may include a source cell. The source BS may be a NTN BS, and the source cell may be a NTN cell. The source BS and the communication device may communicate with each other via the source cell, the satellite signal transceiver, the interface and the satellite. A coverage area of the target BS may include a target cell. The target BS may be a TN BS, and the target cell may be a TN cell. The target BS and the communication device may communicate with each other via the target cell. The coverage area of the source BS and the coverage area of the target BS may overlap (e.g., partially or completely).

In FIG. 2, the source cell overlaps with the target cell. The communication device moves from the source cell to the target cell according to the moving direction. The source BS may hand over the communication device to the target BS according to the network configuration, the preference of the communication device, the measurement report of the communication device or the location of the communication device.

The communication device may be a user equipment (UE), a low cost device (e.g., machine type communication (MTC) device), a device-to-device (D2D) communication device, a narrow-band internet of things (IoT) (NB-IoT), a mobile phone, a laptop, a tablet computer, an electronic book, a portable computer system, or combination thereof. In addition, each of the source BS, the target BS and the communication device can be seen as a transmitter or a receiver according to direction (i.e., transmission direction), e.g., for an uplink (UL), the communication device is the transmitter and each of the source BS and the target BS is the receiver, and for a downlink (DL), each of the source BS and the target BS is the transmitter and the communication device is the receiver.

Figure 3:
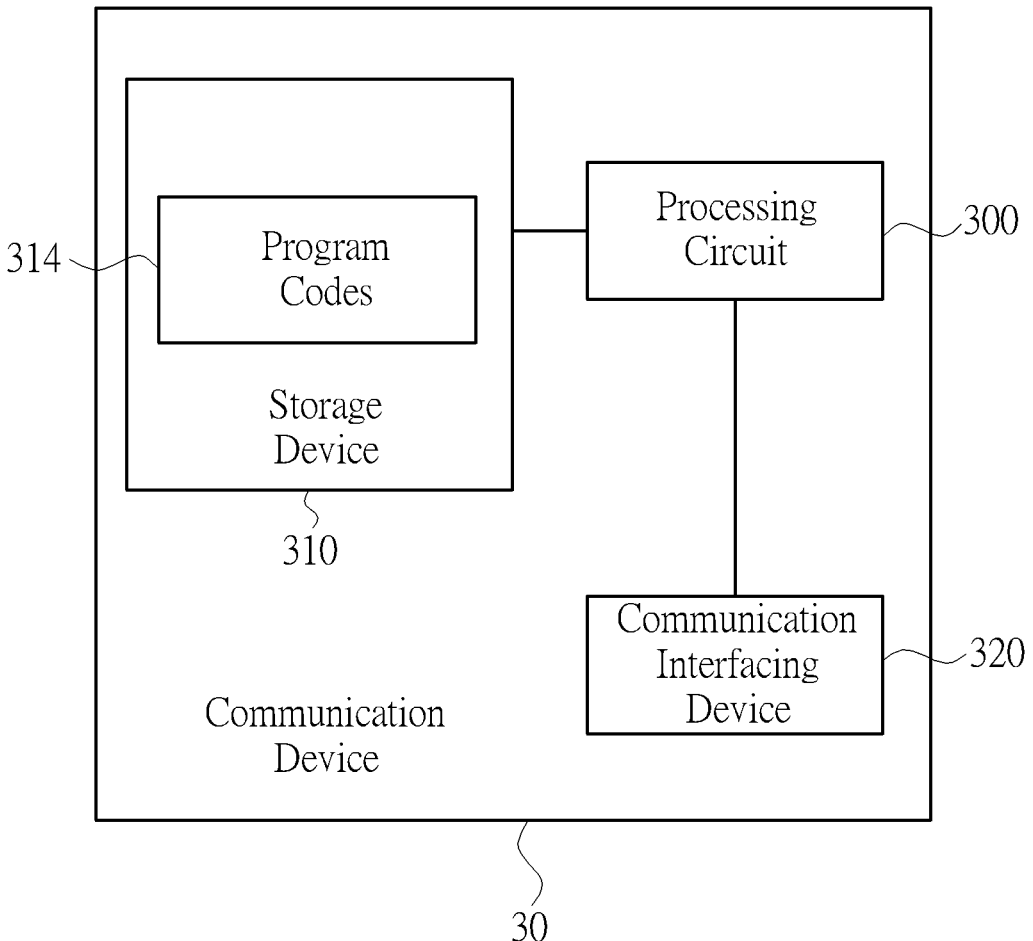
FIG. 3 is a schematic diagram of a communication device according to an example of the present invention.

FIG. 3 is a schematic diagram of a communication device 30 according to an example of the present invention. The communication device 30 may be any of the communication device, the source BS, the target BS, the interface, the satellite signal transceiver or the satellite shown in FIGS. 1 and 2, and is not limited herein. The communication device 30 may include at least one processing circuit 300 such as a microprocessor or Application Specific Integrated Circuit (ASIC), at least one storage device 310 and at least one communication interfacing device 320. The at least one storage device 310 may be any data storage device that may store program codes 314, accessed and executed by the at least one processing circuit 300. Examples of the at least one storage device 310 include but are not limited to a subscriber identity (ID) module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage device, non-transitory computer-readable medium (e.g., tangible media), etc. The at least one communication interfacing device 320 is preferably at least one transceiver and is used to transmit and receive signals (e.g., data, messages and/or packets) according to processing results of the at least one processing circuit 300.

Figure 4:
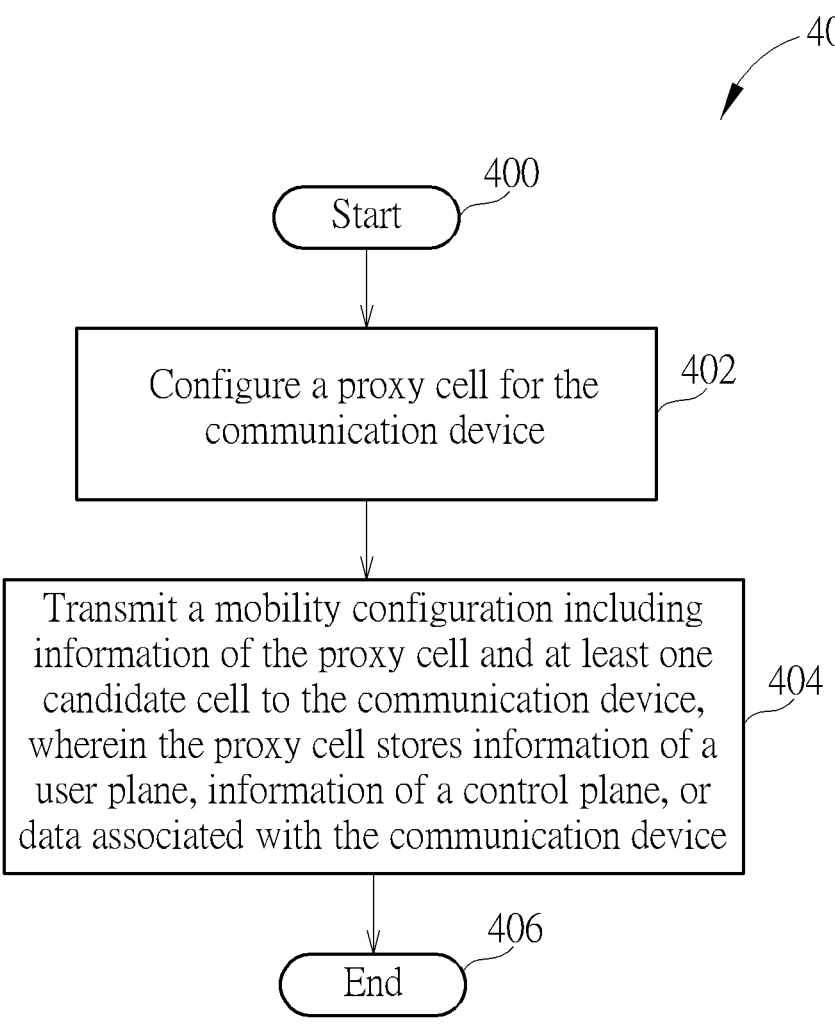
FIG. 4 is a flowchart of a process according to an example of the present invention.

FIG. 4 is a flowchart of a process 40 according to an example of the present invention. The process 40 may be utilized in a cell of a BS (e.g., the source cell of the source BS shown in FIGS. 1 and 2), to handle mobility of a communication device (e.g., the communication device shown in FIGS. 1 and 2). The communication device may be connected with the cell. The process 40 may be compiled into the program codes 314 and includes the following steps:

Step 400: Start.

Step 402: Configure a proxy cell for the communication device.

Step 404: Transmit a mobility configuration including information of the proxy cell and at least one candidate cell to the communication device, wherein the proxy cell stores information of a user plane, information of a control plane, or data associated with the communication device.

Step 406: End.

According to the process 40, the cell may configure the proxy cell for the communication device (e.g., to the at least one candidate cell or to the communication device). The cell may transmit the mobility configuration including information of the proxy cell and the at least one candidate cell to the communication device for the communication device to change a serving cell of the communication device (e.g., change from connecting to the serving cell to connecting to another cell of the BS or another BS). The proxy cell may store information of the user plane, the information of the control plane, or the data associated with the communication device. That is, the at least one candidate cell obtains the information of the proxy cell. Accordingly, the at least one candidate cell may obtain the data of the communication device from the proxy cell and may not need to obtain the data of the communication device from the cell, when the at least one candidate cell intends to obtain the data of the communication device. Thus, the transmission delay resulted from the long distance with the cell is reduced accordingly.

Realization of the process 40 is not limited to the above description. The following examples may be applied for realizing the process 40.

In one example, the cell may comprise (e.g., be) a serving cell of the communication device.

In one example, the BS may configure the proxy cell to the at least one candidate cell and may transmit the mobility configuration including information (e.g., ID) of the proxy cell to the communication device via the cell (e.g., controlled by or served by) the BS. In one example, the mobility configuration may include ID of the serving cell of the communication device. In one example, the at least one candidate cell may be determined by the cell for the communication device to establish connection with and to change serving cell to, e.g., according to the network configuration, the preference of the communication device, the measurement report of the communication device or the location of the communication device. The mobility configuration may include the information of the at least one candidate cell. In one example, the at least one candidate cell may belong to the same BS or different BSs. The same BS or the different BSs may include neighboring BS of the target BS.

In one example, the mobility may include a handover. The cell may configure a candidate cell to the communication device according to the mobility configuration, for the communication device to perform the mobility procedure to change the serving cell to establish connection with the candidate cell. A target cell to which the communication device is performing mobility procedure to establish connection with and to change the serving cell to may be the candidate cell. In one example, the mobility may include a conditional handover (CHO) that a mobility procedure that is executed (e.g., performed, initiated) when the configured execution condition(s) are met. The cell may configure the at least one candidate cell to the communication device, for the communication device to perform the CHO with the at least one candidate cell. The communication device may perform the CHO by selecting a target cell according to its currently perceived radio condition and performing the mobility procedure with the target cell. The target cell may or may not be any one of the at least one candidate cell. The currently perceived radio condition may include a reference symbol received power (RSRP) of the at least one candidate cell, a RSRP of the target cell, a RSRP of the source cell, a radio condition or may include reference symbol received quality (RSRQ) of the at least one candidate cell, a RSRQ of the target cell, or a RSRP of the source cell.

In one example, the information stored in the proxy cell for the communication device may be accessed by at least one cell other than the proxy cell (e.g., the at least one of the candidate cell) for handling the mobility of the communication device. In one example, the cell may include a NTN cell.

In one example, the cell may configure the proxy cell for the communication device to the at least one candidate cell via transmitting the information of the proxy cell to the at least one candidate cell.

In one example, the cell may transmit an authentication information to the at least one candidate cell, wherein the authentication information is for authorizing the communication device. The authentication information may include a physical cell ID (PCI) of the cell, a cell global ID (CGI) of the cell, an ID of the communication device configured by the cell of the communication device, an ID of the communication device configured by the target cell, or a number calculated by using at least one of the identities of the cell, the target cell, and the communication device.

In one example, the cell may configure the proxy cell for the communication device to the at least one candidate cell via pre-configuration the information of the proxy cell shared among the cell and the at least one candidate cell. In one example, the cell may configure the proxy cell for the communication device to the at least one candidate cell via sharing the information of the proxy cell with the at least one candidate cell. That is, the proxy cell is pre-configured as shared information of the cell. The sharing of the information of the proxy cell may be, e.g., configured by a core network (CN) function of a 5G CN via Operation Administration and Maintenance (OAM) signaling, or configured by the CN function of the 5G CN by information exchange via interface(s) between the 5G CN and a radio access network (RAN), or configured by the cell via an inter-cell information exchange.

In one example, the cell may transmit an indication to the at least one candidate cell, wherein the indication indicates that the communication device performs a mobility procedure (e.g., to establish a connection with and to change the cell of the communication device). The cell of the communication device may include (e.g., be) a NTN cell before the communication device performs the mobility procedure. The indication may include a NTN to TN mobility indication, a NTN to NTN mobility indication, a TN to NTN mobility indication or a TN to TN mobility indication.

In one example, the proxy cell may be determined (e.g., selected) by the cell. The cell may determine the proxy cell before transmitting the mobility configuration to the communication device. In one example, the proxy cell may include (e.g., be) a first cell of the BS (i.e., a BS to which the proxy cell belongs and a BS to which the cell belongs are the same BS), a second cell of a second BS, or a functional element of a RAN.

In one example, the cell may transmit the information of the user plane, the information of the control plane, or the data associated with the communication device to the proxy cell. The transmission between the cell and the proxy cell may be performed via an inter-cell or inter-gNB interface (e.g., Xn interface). That is, the proxy cell may provide service(s) to other BS(s) or cell(s), and may not provide service to the communication device.

In one example, the mobility configuration may include (e.g., be) a radio resource control (RRC) connection reconfiguration message. In one example, the mobility configuration may be transmitted by (e.g., via or in) a RRC reconfiguration message. In one example, the mobility configuration may include configuration of the at least one candidate cell.

In one example, the information of the proxy cell may include an ID of the proxy cell. The ID of the proxy cell may be a network address (e.g., internet protocol (IP) address) of the proxy cell, a tunnel endpoint identifier (TEID) of the proxy cell, or a global cell ID (GCI) of the proxy cell. In one example, the information of the proxy cell may include an indication indicating that the proxy cell is supported (e.g., applied) for the mobility of the communication device.

Figure 5:
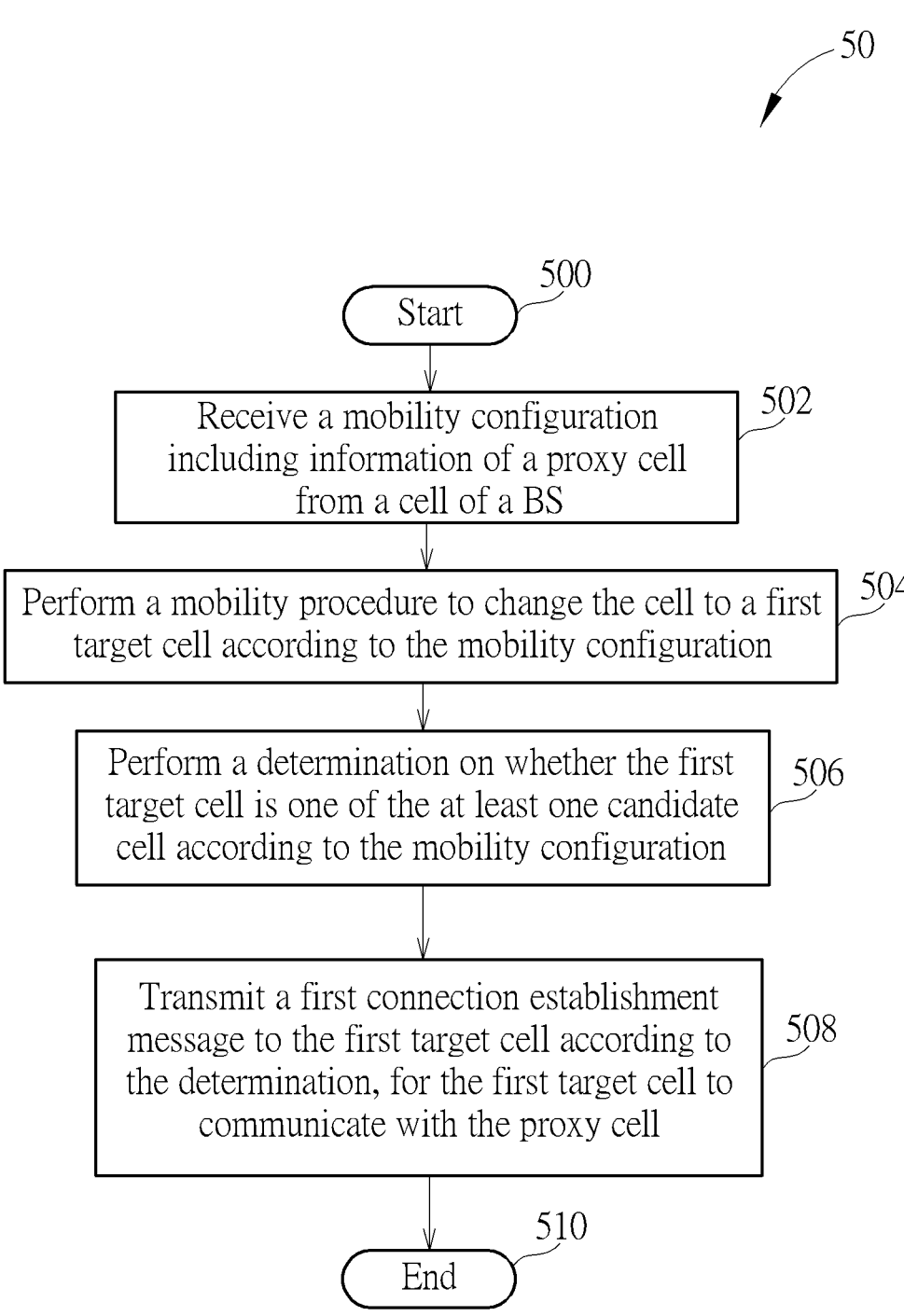
FIG. 5 is a flowchart of a process according to an example of the present invention.

FIG. 5 is a flowchart of a process 50 according to an example of the present invention. The process 50 may be utilized in a communication device (e.g., the communication device shown in FIGS. 1 and 2), to handle mobility of the communication device. The process 50 may be compiled into the program code 314 and includes the following steps:

8

Step 500: Start.

Step 502: Receive a mobility configuration including information of a proxy cell from a cell (e.g., the source cell shown in FIGS. 1 and 2) of a BS (e.g., the source BS shown in FIGS. 1 and 2).

Step 504: Perform a mobility procedure to change the cell to a first target cell (e.g., the target cell shown in FIGS. 1 and 2) according to the mobility configuration.

Step 506: Perform a determination on whether the first target cell is one of the at least one candidate cell according to the mobility configuration.

Step 508: Transmit a first connection establishment message to the first target cell according to the determination, for the first target cell to communicate with the proxy cell.

Step 510: End.

According to the process 50, the communication device may receive the mobility configuration including the information (e.g., ID, configuration) of the proxy cell from the cell of the BS. The communication device may perform a mobility procedure to change the cell to the first target cell (e.g., change from connecting to the cell to connecting to the first target cell) according to the mobility configuration. The communication device may perform the determination on whether the first target cell is the one of the at least one candidate cell according to the mobility configuration. The communication device may transmit the first connection establishment message to the first target cell according to the determination, for the first target cell to communicate with the proxy cell. That is, the communication device obtains the information of the proxy cell. The communication device may provide the information of the proxy cell to the first target cell, for the first target cell to obtain data of the UE from the proxy cell. The first target may obtain the information (e.g., may include the control plane configuration information, the user plane configuration information, or the user plane data) of the communication device from the proxy cell and may not need to obtain the information of the communication device from the cell, when the first target cell intends to obtain the information of the communication device. Thus, the transmission delay resulted from the long distance with the BS is reduced.

Realization of the process 50 is not limited to the above description. The following examples may be applied for realizing the process 50.

In one example, the cell may be controlled by or served by the BS. In one example, the cell may comprises (e.g., be) a serving cell of the communication device.

In one example, the mobility may include a handover. The communication device may be configured with a candidate cell by the cell according to the mobility configuration, for the communication device to perform the mobility procedure to establish connection with the candidate cell and to change the cell to the candidate cell. The first target cell to which the communication device is performing the mobility procedure to may be one of the candidate cell. In one example, the communication device may be configured with the at least one candidate cell by the cell according to the mobility configuration, for the communication device to perform the mobility procedure with the at least one candidate cell. The communication device may perform the mobility procedure by selecting the first target cell according to its currently perceived radio condition and performing the mobility procedure with the first target cell. The first target cell may or may not be one of the at least one candidate cell. The currently perceived radio condition may include a RSRP of the at least one candidate cell, a RSRP of the first target cell, a RSRP of the cell, a RSRQ of the at least one candidate cell, a RSRQ of the first target cell, or a RSRQ of the cell.

In one example, the first connection establishment message may include a RRC Reestablishment Request message. In one example, the first connection establishment message may include at least one of a physical cell ID (PCI) of the cell, information of the cell and an ID of the proxy cell. In one example, the information of cell may include a CGI of the cell, a NTN mobility indication, a public land mobile network (PLMN) ID of the cell or a frequency ID (e.g., an absolute radio frequency channel number (ARFCN)) of the cell. The at least one candidate cell may be configured with the ID (e.g., PCI, CGI, TEID) of the cell by the cell when the cell configures the proxy cell to the at least one candidate cell. When the communication device determines that the target cell is not one of the at least one candidate cell, the communication device provides assistant information (e.g., the information of the cell) for the target cell to distinguish the target cell and the cell. The target cell may uniquely identify the cell according to the information of the cell.

In one example, the information of the cell may include a NTN mobility indication, a PLMN ID of the cell, a global cell ID (GCI) of the cell or a frequency ID (e.g., an ARFCN) of the cell. The mobility indication may include a NTN to TN mobility indication, a NTN to NTN mobility indication, a TN to TN mobility indication or a TN to NTN mobility indication. The PLMN ID of the cell may include a NTN PLMN ID of the cell or a TN PLMN ID of the cell. The frequency ID of the cell may include a preconfigured ID of an ARFCN of the cell.

In one example, the first connection establishment message may include the PCI of the cell, and the determination may include (e.g., when determining) that the first target cell is the one of the at least one candidate cell. In one example, the first connection establishment message may include the ID of the proxy cell, and the ID of the proxy cell may be one of at least one cell ID included in the at least one candidate cell and is indicated by the cell by an indicator included in the mobility configuration. The first target cell may authenticate the communication device according to the PCI of the cell and the authentication information transmitted by the communication device. In one example, when the mobility configuration indicated a proxy cell is supported for the mobility and the proxy cell ID is not explicitly provided by an information element included in the mobility configuration, if the ID of the proxy cell is one of the cell ID included in the at least one candidate cell and is indicated by the cell with an indicator included in the mobility configuration. The communication device may determine the cell ID of the at least one candidate cell indicated by the cell with an indicator as the proxy cell ID and include the proxy cell ID in first connection establishment message.

In one example, the first connection establishment message may include the ID of the proxy cell, the PCI of the cell and the information of the cell, and the determination may include (e.g., when determining) that the first target cell is not the one of the at least one candidate cell. In one example, the communication device may determine that the ID of the proxy cell is an ID of the at least one candidate cell with a first order, when the mobility configuration indicated a proxy cell is supported for the mobility and the ID of the proxy cell is not explicitly provided by an information element included in the mobility configuration provided from the cell to the communication device.

In one example, the first connection establishment message may include a cell radio network temporary identifier (C-RNTI) of the communication device in the cell. In one example, the first connection establishment message may include an authentication information of the communication device which is configured by the cell in the mobility configuration. In one example, the authentication information of the communication device may include a message authentication code-integrity (MAC-I) or a short MAC-I. The MAC-I or the short MAC-I may be generated (e.g., calculated) by the communication device, for the first target cell authorizing the integrity of the communication device. The short MAC-I may include part of (e.g., 16 least significant) bits of the MAC-I.

In one example, the communication device may determine a second target cell according to the mobility configuration, when determining that transmitting the first connection establishment message is failed. The communication device may transmit a second connection establishment message to the second target cell.

In one example, the second connection establishment message may include the ID of the proxy cell, the PCI of the cell and the information of the cell.

In one example, the mobility configuration may be transmitted by (e.g., via or in) a RRC reconfiguration message. In one example, the handover configuration may include configuration of the at least one candidate cell. That is, the communication device is configured with the at least one candidate cell by the cell according to the mobility configuration.

In one example, the information of the proxy cell may include an indication indicating that the proxy cell is supported (e.g., applied) for the communication device.

Figure 6:
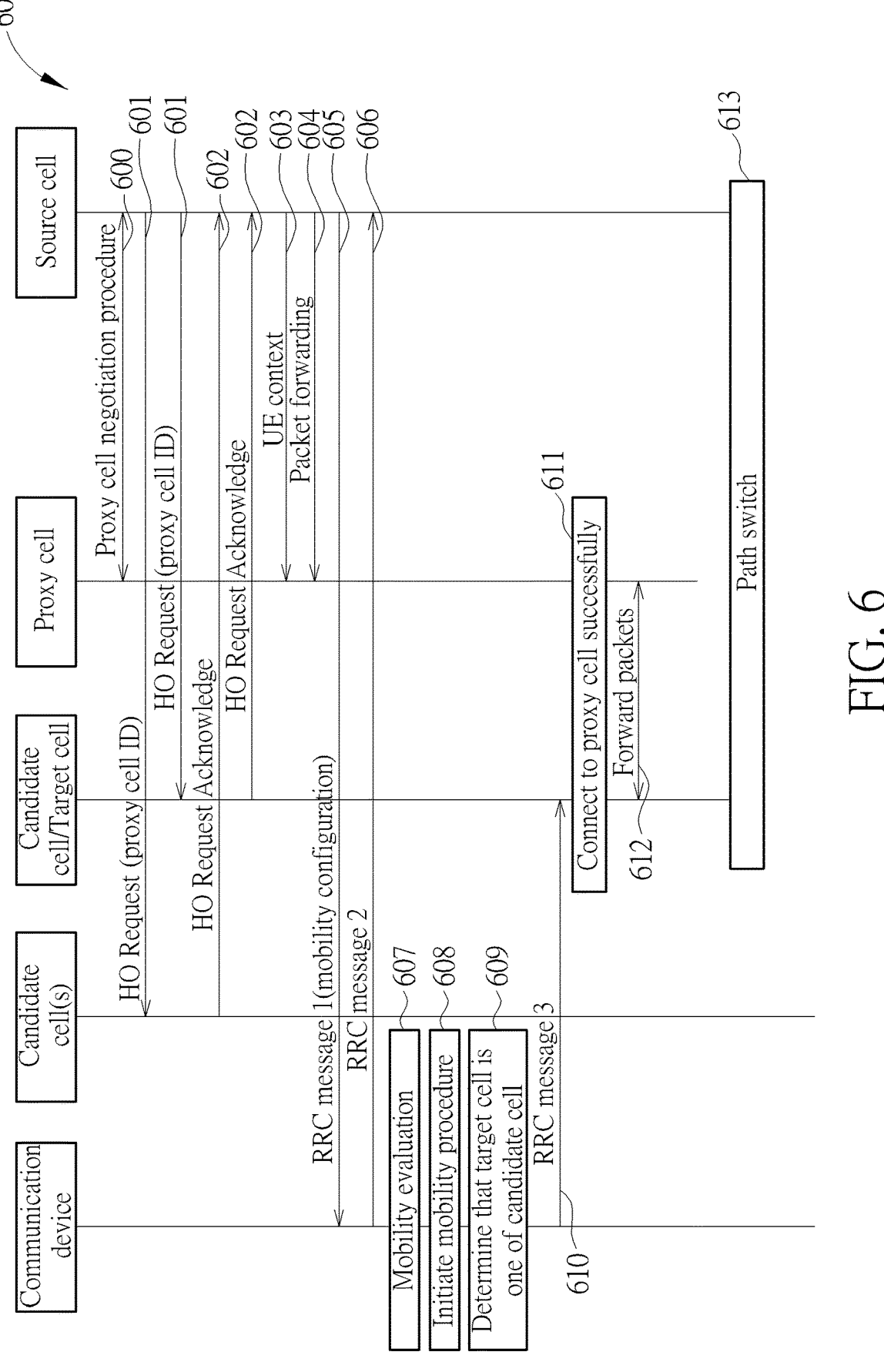
FIG. 6 is a schematic flowchart of a process according to an example of the present invention.

FIG. 6 is a schematic flowchart of a process 60 according to an example of the present invention, where network entities such as a communication device, at least one candidate cell, a target cell, a proxy cell and a source cell are shown. The operations, messages, configurations of the network entities are simplified for ease of the illustration, but are not limited herein. The process 60 may be applied to the wireless communication system 10 in FIG. 1 or the wireless communication system 20 in FIG. 2. At step 600, the source cell performs a proxy cell negotiation procedure with the proxy cell. At step 601, the source cell transmits a handover request message including a proxy cell ID to the at least one candidate cell. That is, the source cell explicitly indicates the proxy cell to the at least one candidate cell. At step 602, the source cell receives a handover request acknowledge message from the at least one candidate cell in response to the handover request message. At step 603, the source cell transmits a UE context message to the proxy cell. At step 604, the source cell performs packet forwarding to the proxy cell to forward user plane packets associated with the communication device to the proxy cell. At step 605, the source cell transmits a first RRC message (e.g., RRC message 1) including a mobility configuration to the communication device. At step 606, the source cell receives a second RRC message (e.g., RRC message 2) from the communication device in response to the first RRC message. At step 607, the communication device performs a mobility evaluation according to the first RRC message and determines a target cell. At step 608, the communication device initiates a mobility procedure according to the mobility evaluation and the mobility configuration. At step 609, the communication device determines that the target cell is one of the at least one candidate cell according to the first RRC message. At step 610, the communication device transmits a third RRC message (e.g., RRC message 3) in response to the determination. The third RRC message may further include at least one of a source cell PCI, a C-RNTI associated with the communication device provided by the source cell, and an authentication information associated with the communication device.

At step 611, the target cell (i.e., the one of the at least one candidate cell) connects to the proxy cell and obtains information associated with the communication device for the proxy cell successfully in response to the RRC reestablishment request message. At step 612, for obtaining packets associated with the communication device from the proxy cell, the target cell requests the proxy cell for the information of the communication device and the proxy cell forwards information of the communication device including data packets associated with the communication device to the target cell. That is, the target cell successfully retrieves data packets of the communication device from the proxy cell. At step 613, the target cell and the source cell perform a path switch with involving CN entities (e.g., Access and Mobility Management Function (AMF), User Plane Function (UPF)) to establish a connection associated with the communication device to the CN and may further to request the switch of the DL user plane data transmission towarding the target cell.

Figure 7:
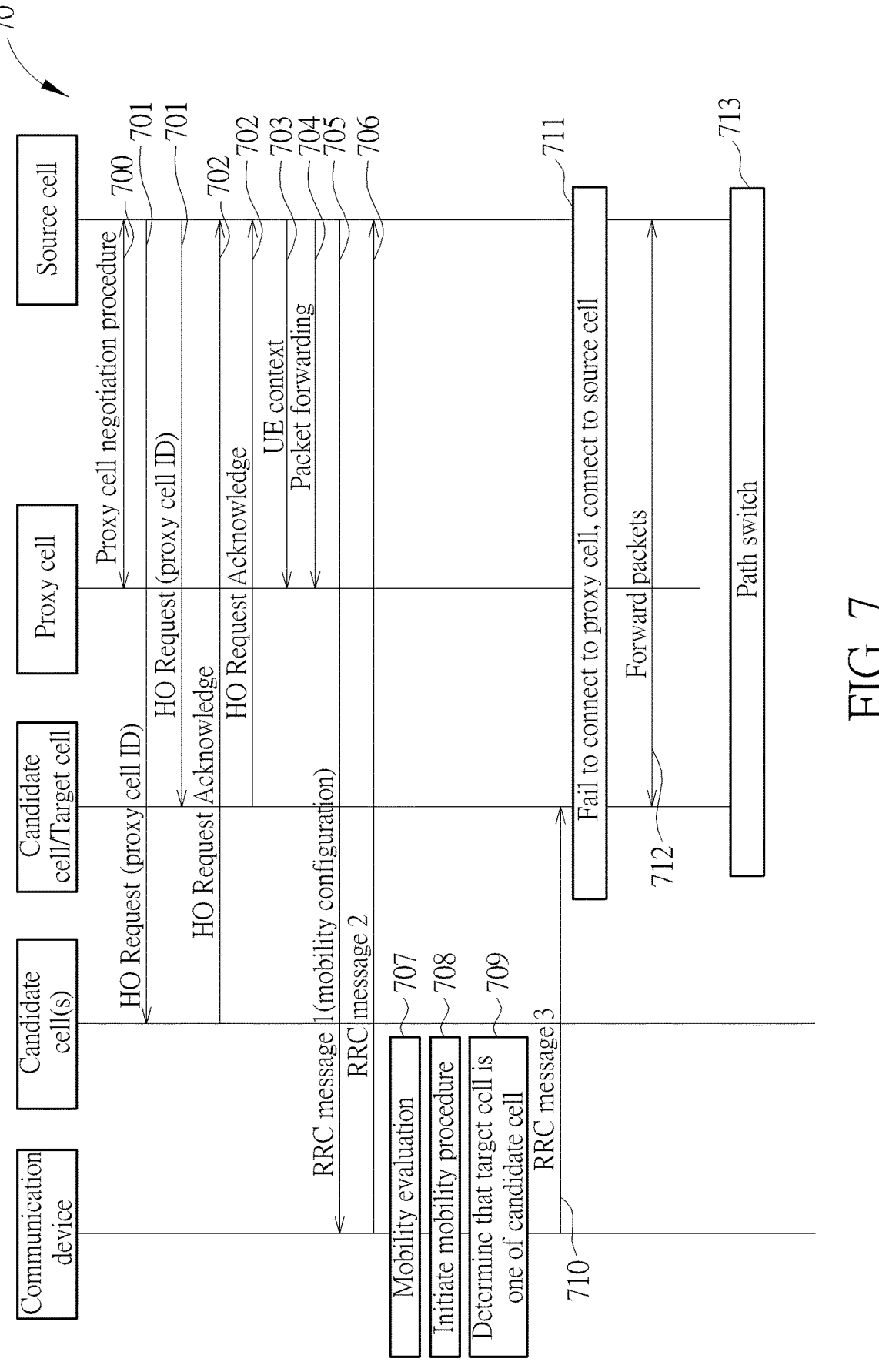
FIG. 7 is a schematic flowchart of a process according to an example of the present invention.

FIG. 7 is a schematic flowchart of a process 70 according to an example of the present invention, where network entities such as a communication device, at least one candidate cell, a target cell, a proxy cell and a source cell are shown. The operations, messages, configurations of the network entities are simplified for ease of the illustration, but are not limited herein. The process 70 may be applied to the wireless communication system 10 in FIG. 1 or the wireless communication system 20 in FIG. 2. The steps 700-710 are similar to the steps 600-610, and are not repeated herein. At step 711, the target cell (i.e., the one of the at least one candidate cell) fails to connect to the proxy cell and connects to the source cell. At step 712, the target cell requests the source cell for the information of the communication device and the source cell forwards information of the communication device including data packets associated with the communication device to the target cell. That is, the target cell unsuccessfully retrieves data of the communication device from the proxy cell. At step 713, the target cell and the source cell perform a path switch with involving CN entities.

Figure 8:
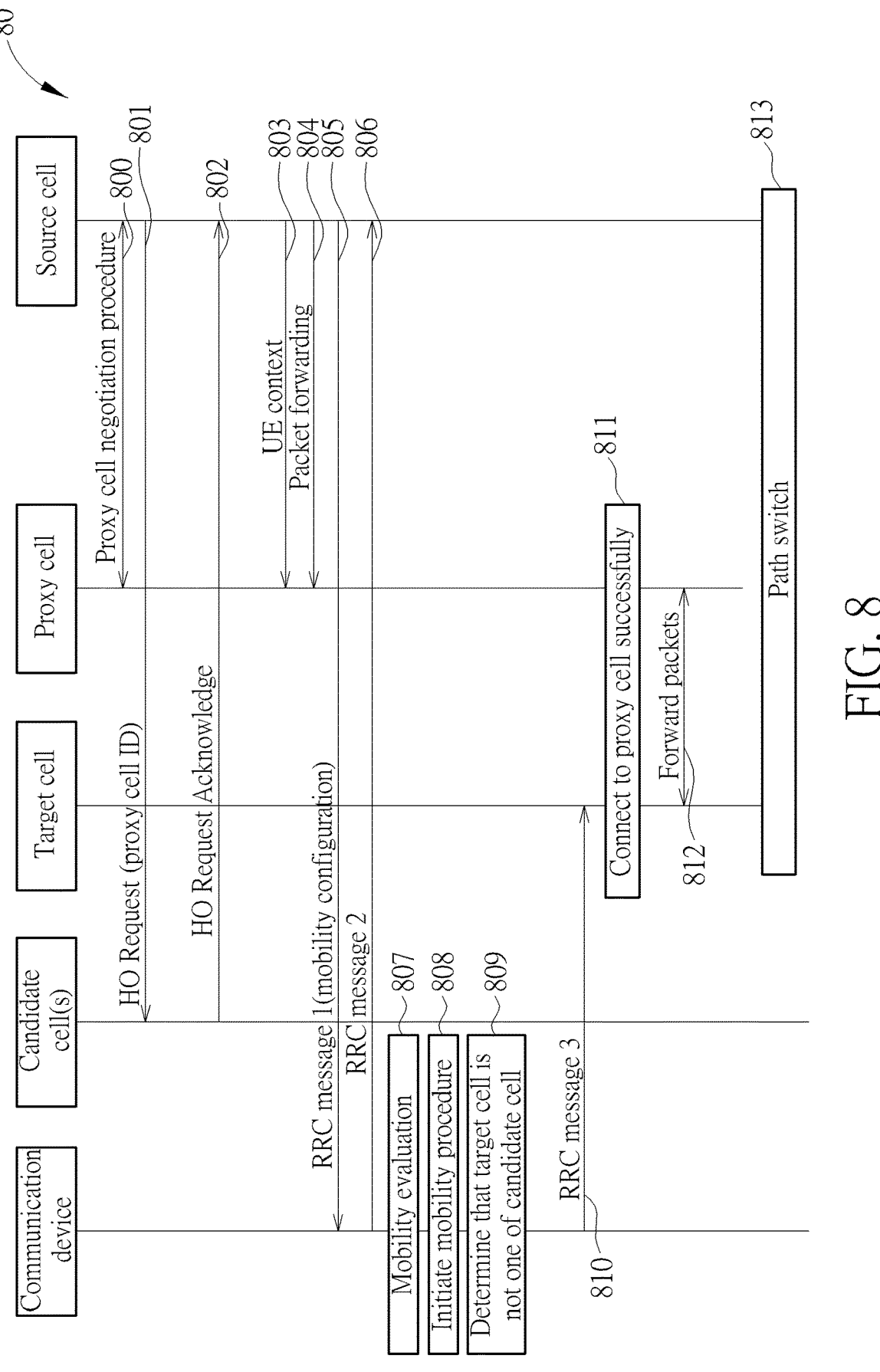
FIG. 8 is a schematic flowchart of a process according to an example of the present invention.

FIG. 8 is a schematic flowchart of a process 80 according to an example of the present invention, where network entities such as a communication device, at least one candidate cell, a target cell, a proxy cell and a source cell are shown. The operations, messages, configurations of the network entities are simplified for ease of the illustration, but are not limited herein. The process 80 may be applied to the wireless communication system 10 in FIG. 1 or the wireless communication system 20 in FIG. 2. The steps 800-808 are similar to the steps 600-608, and are not repeated herein. At step 809, the communication device determines that the target cell is the not one of the at least one candidate cell according to the first RRC message (e.g., RRC message 1). At step 810, the communication device transmits a third RRC message (e.g., RRC message 3) to the target cell in response to the determination. The third RRC message may further include at least one of a source cell PCI, information of the source cell, and a C-RNTI associated with the communication device provided by the source cell, and an authentication information associated with the communication device. The steps 811-813 are similar to the steps 611-613, and are not repeated herein.

Figure 9:
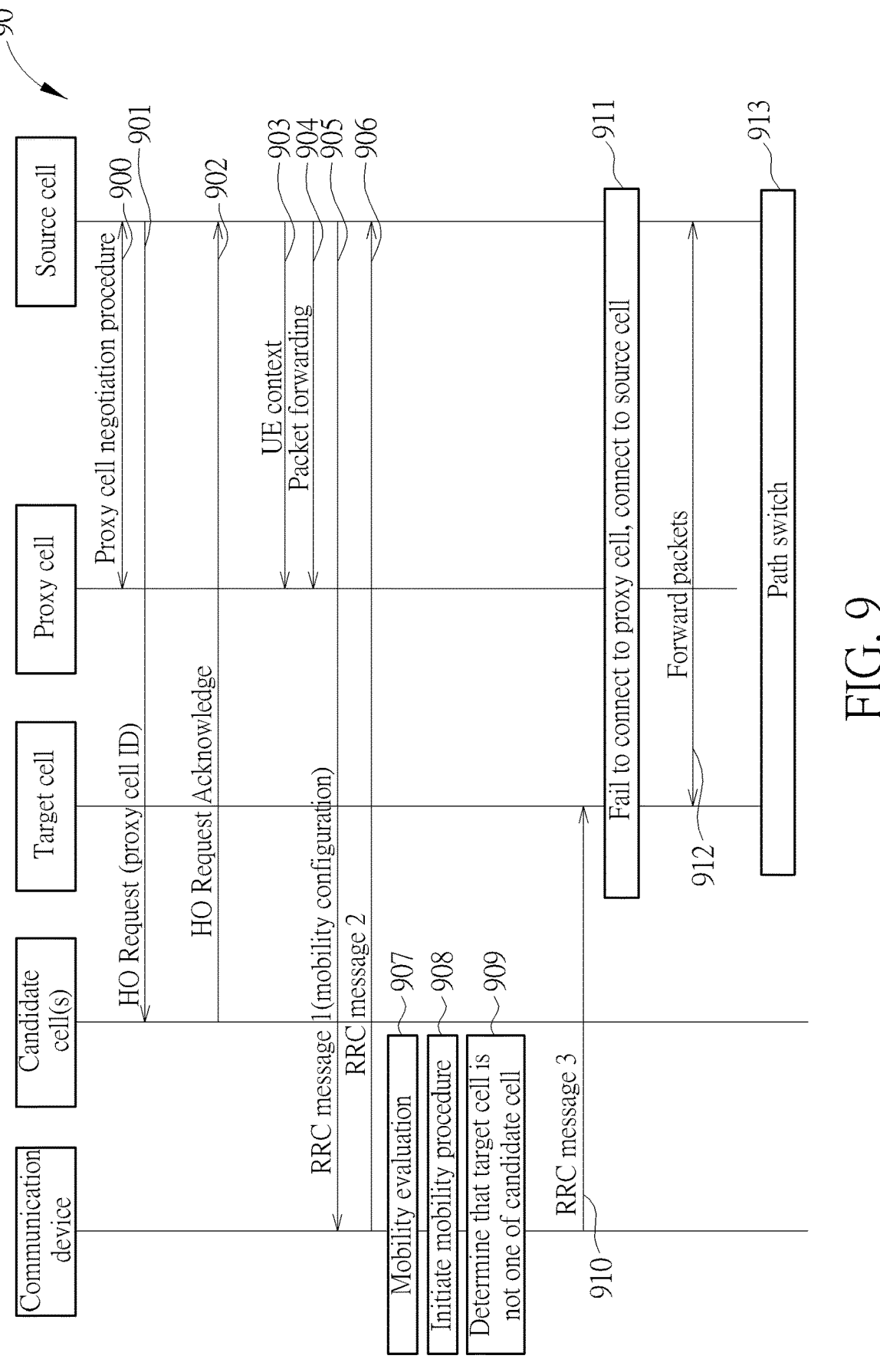
FIG. 9 is a schematic flowchart of a process according to an example of the present invention.

FIG. 9 is a schematic flowchart of a process 90 according to an example of the present invention, where network entities such as a communication device, at least one candidate cell, a target cell, a proxy cell and a source cell are shown. The operations, messages, configurations of the network entities are simplified for ease of the illustration, but are not limited herein. The process 90 may be applied to the wireless communication system 10 in FIG. 1 or the wireless communication system 20 in FIG. 2. The steps 900-910 are similar to the steps 800-810, and are not repeated herein. The steps 911-913 are similar to the steps 711-713, and are not repeated herein.

Figure 10:
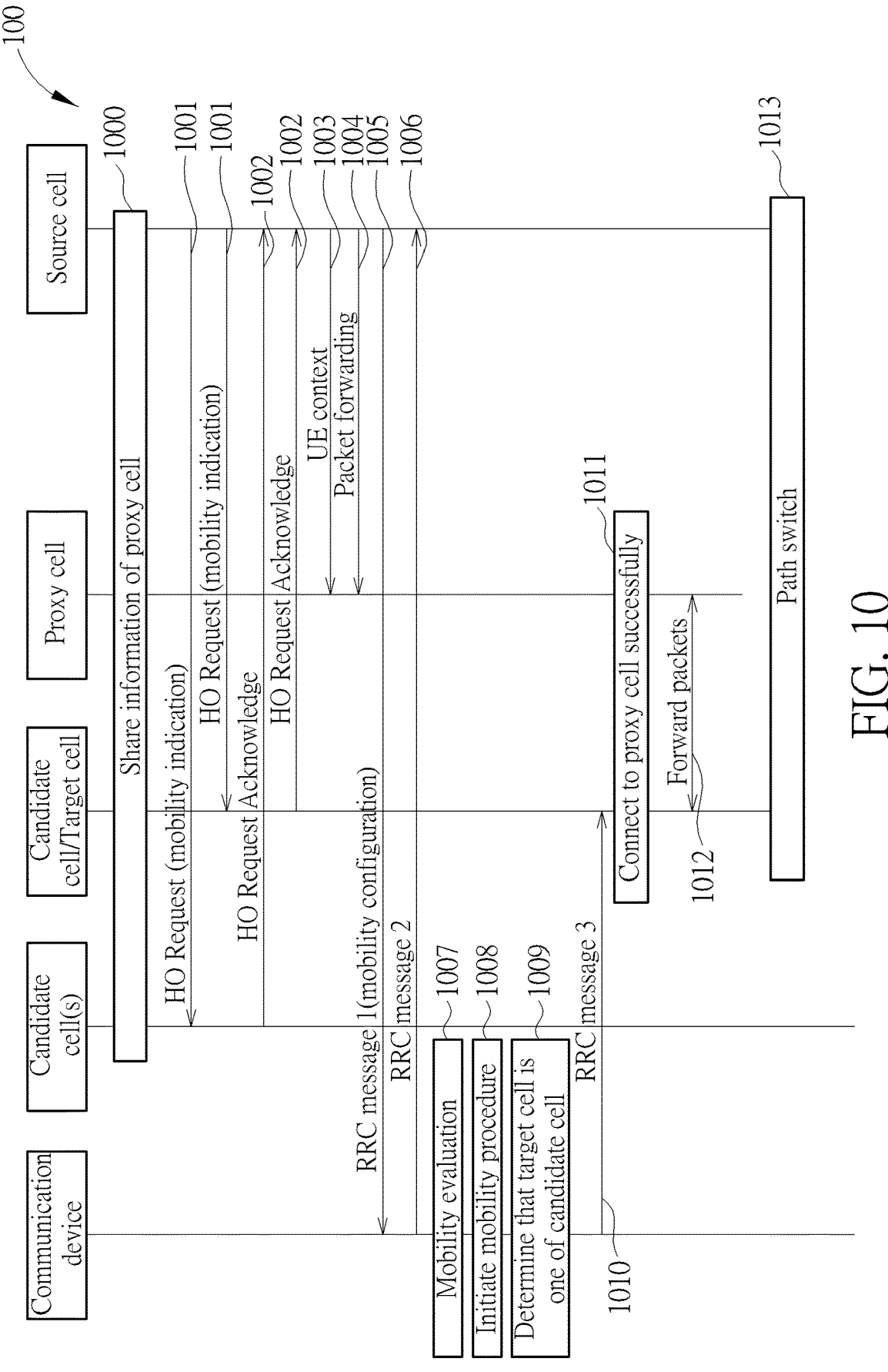
FIG. 10 is a schematic flowchart of a process according to an example of the present invention.

FIG. 10 is a schematic flowchart of a process 100 according to an example of the present invention, where network entities such as a communication device, at least one candidate cell, a target cell, a proxy cell and a source cell are shown. The operations, messages, configurations of the network entities are simplified for ease of the illustration, but are not limited herein. The process 100 may be applied to the wireless communication system 10 in FIG. 1 or the wireless communication system 20 in FIG. 2. At step 1000, the source cell shares information of the proxy cell with the at least one candidate cell. At step 1001, the source cell transmits a handover request message including a mobility indication to the at least one candidate cell. At step 1002, the source cell receives a handover request acknowledge message from the at least one candidate cell in response to the handover request message. The steps 1003-1013 are similar to the steps 603-613, and are not repeated herein.

Figure 11:
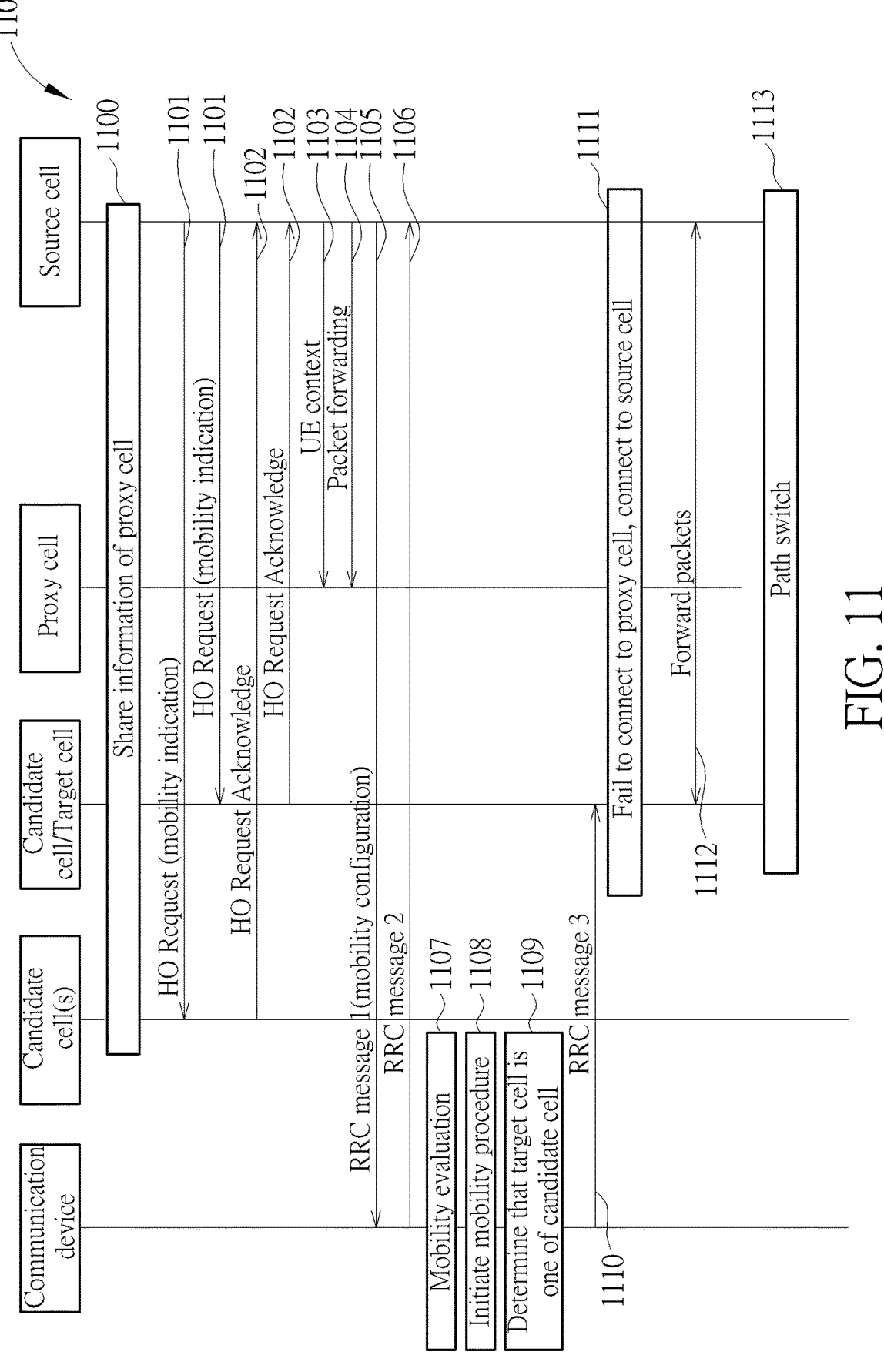
FIG. 11 is a schematic flowchart of a process according to an example of the present invention.

FIG. 11 is a schematic flowchart of a process 110 according to an example of the present invention, where network entities such as a communication device, at least one candidate cell, a target cell, a proxy cell and a source cell are shown. The operations, messages, configurations of the network entities are simplified for ease of the illustration, but are not limited herein. The process 110 may be applied to the wireless communication system 10 in FIG. 1 or the wireless communication system 20 in FIG. 2. The steps 1100-1102 are similar to the steps 1000-1002, and are not repeated herein. The steps 1103-1113 are similar to the steps 703-713, and are not repeated herein.

Figure 12:
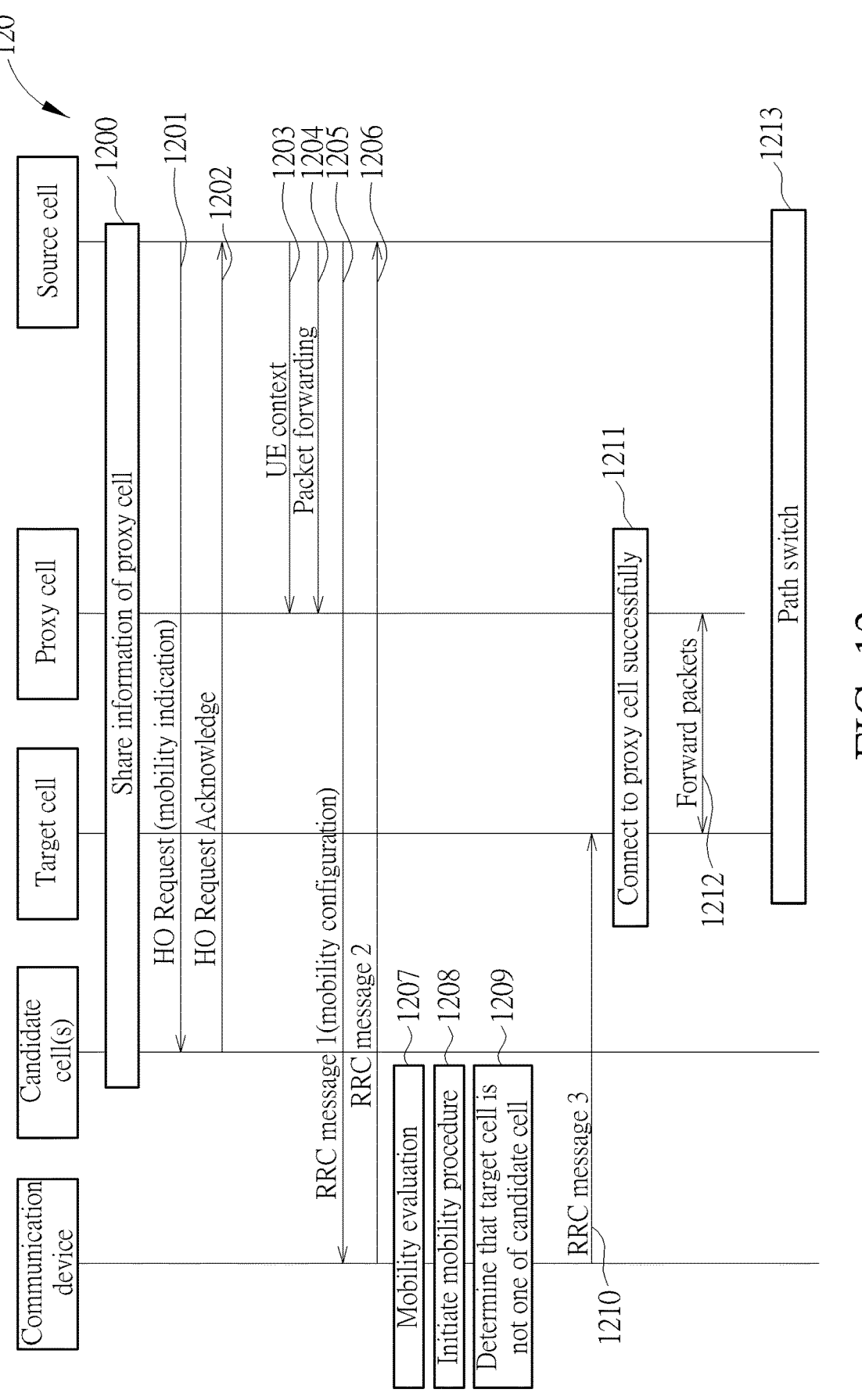
FIG. 12 is a schematic flowchart of a process according to an example of the present invention.

FIG. 12 is a schematic flowchart of a process 120 according to an example of the present invention, where network entities such as a communication device, at least one candidate cell, a target cell, a proxy cell and a source cell are shown. The operations, messages, configurations of the network entities are simplified for ease of the illustration, but are not limited herein. The process 120 may be applied to the wireless communication system 10 in FIG. 1 or the wireless communication system 20 in FIG. 2. The steps 1200-1202 are similar to the steps 1000-1002, and are not repeated herein. The steps 1203-1213 are similar to the steps 803-813, and are not repeated herein.

Figure 13:
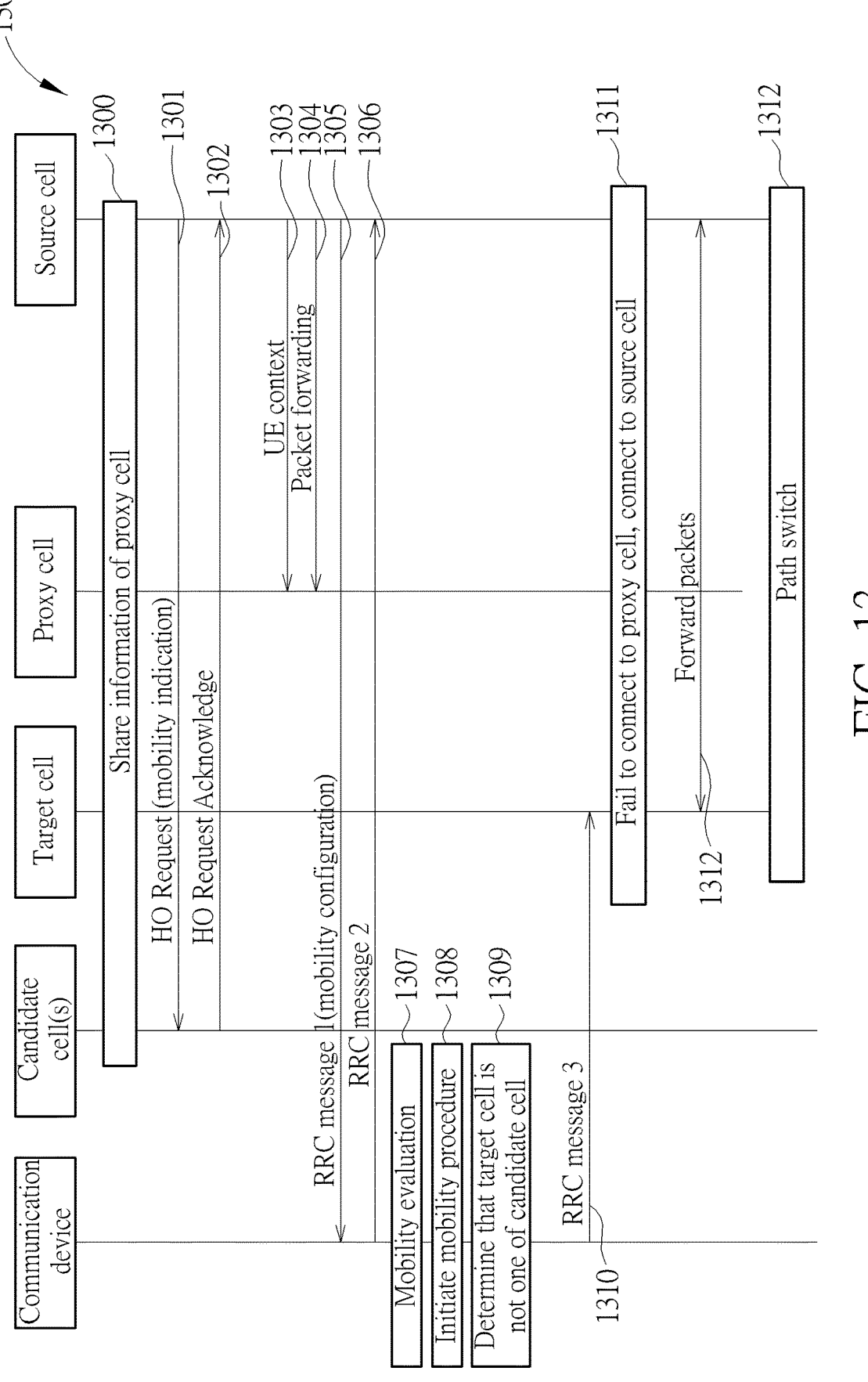
FIG. 13 is a schematic flowchart of a process according to an example of the present invention.

FIG. 13 is a schematic flowchart of a process 130 according to an example of the present invention, where network entities such as a communication device, at least one candidate cell, a target cell, a proxy cell and a source cell are shown. The operations, messages, configurations of the network entities are simplified for ease of the illustration, but are not limited herein. The process 130 may be applied to the wireless communication system 10 in FIG. 1 or the wireless communication system 20 in FIG. 2. The steps 1300-1302 are similar to the steps 1000-1002, and are not repeated herein. The steps 1303-1313 are similar to the steps 903-913, and are not repeated herein.

Figure 14:
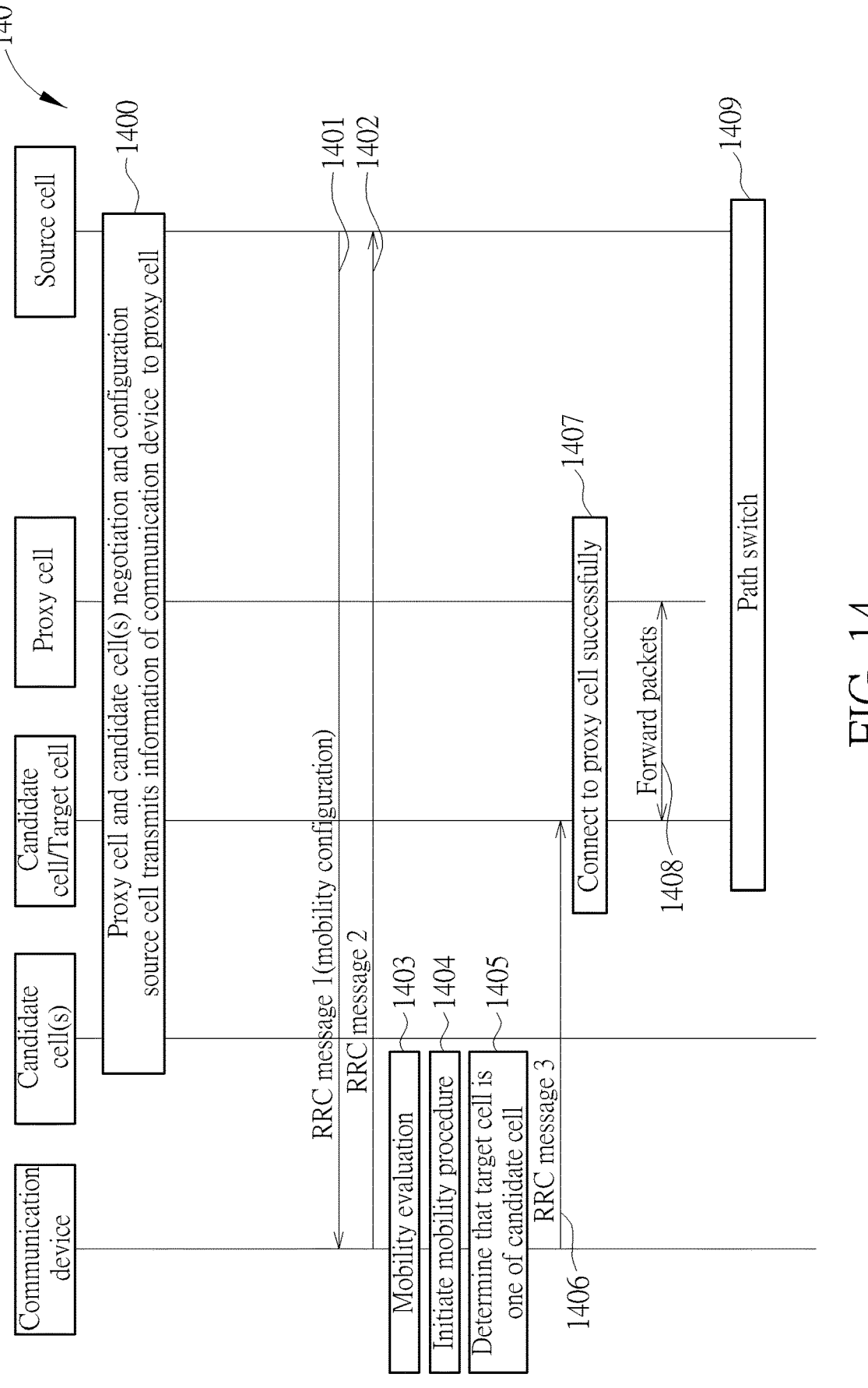
FIG. 14 is a schematic flowchart of a process according to an example of the present invention.

FIG. 14 is a schematic flowchart of a process 140 according to an example of the present invention, where network entities such as a communication device, at least one candidate cell, a target cell, a proxy cell and a source cell are shown. The operations, messages, configurations of the network entities are simplified for ease of the illustration, but are not limited herein. The process 140 may be applied to the wireless communication system 10 in FIG. 1 or the wireless communication system 20 in FIG. 2. At step 1400, the source cell performs negotiation and configuration with the proxy cell and the at least one candidate cell. The source cell transmits information of communication device to proxy cell. At step 1401, the source cell transmits a first RRC message (e.g., RRC message 1) including a mobility configuration to the communication device. The mobility configuration includes the ID of the proxy cell (e.g., a proxy cell ID). At step 1402, the source cell receives a second RRC message (e.g., RRC message 2) from the communication device in response to the first RRC message. At step 1403, the communication device performs a mobility evaluation according to the first RRC message and determines a target cell. At step 1404, the communication device initiates a mobility procedure according to the mobility evaluation. At step 1405, the communication device determines that the target cell is one of the at least one candidate cell according to the first RRC message. At step 1406, the communication device transmits a third RRC message (e.g., RRC message 3) including the proxy cell ID, a source cell PCI and a C-RNTI to the target cell in response to the determination. That is, the communication device provides the proxy cell ID to the target cell.

At step 1407, the target cell (i.e., the one of the at least one candidate cell) connects to the proxy cell successfully. At step 1408, the target cell requests the proxy cell for the information of the communication device and the proxy cell forwards information of the communication device including data packets associated with the communication device to the target cell. At step 1409, the target cell and the source cell perform a path switch with involving CN entities.

Figure 15:
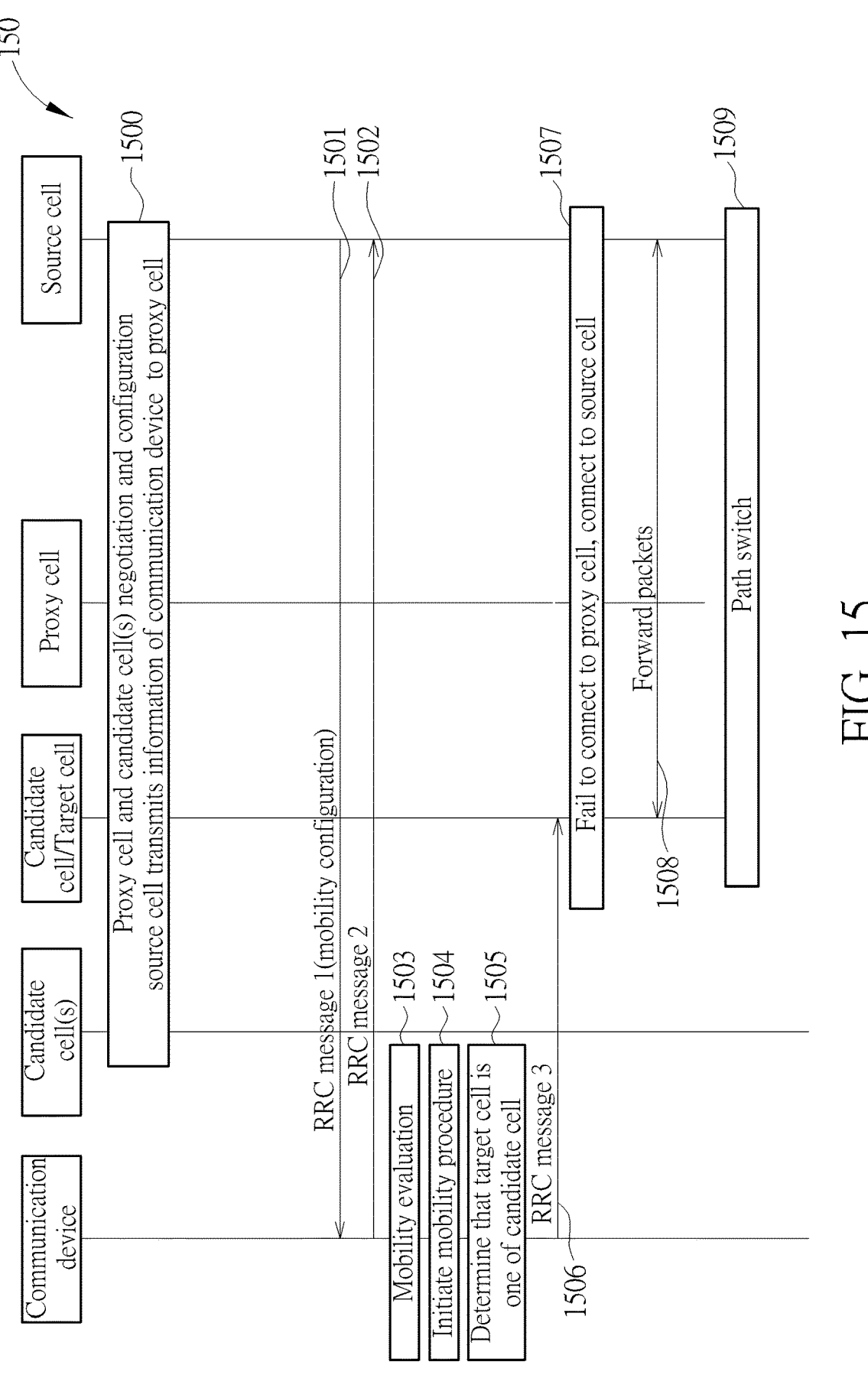
FIG. 15 is a schematic flowchart of a process according to an example of the present invention.

FIG. 15 is a schematic flowchart of a process 150 according to an example of the present invention, where network entities such as a communication device, at least one candidate cell, a target cell, a proxy cell and a source cell are shown. The operations, messages, configurations of the network entities are simplified for ease of the illustration, but are not limited herein. The process 150 may be applied to the wireless communication system 10 in FIG. 1 or the wireless communication system 20 in FIG. 2. The steps 1500-1506 are similar to the steps 1400-1406, and are not repeated herein. At step 1507, the target cell (i.e., the one of the at least one candidate cell) fails to connect to the proxy cell and connects to the source cell. At step 1508, the target cell requests the source cell for the information of the communication device and the source cell forwards information of the communication device including data packets associated with the communication device to the target cell. At step 1509, the target cell and the source cell perform a path switch with involving CN entities.

Figure 16:
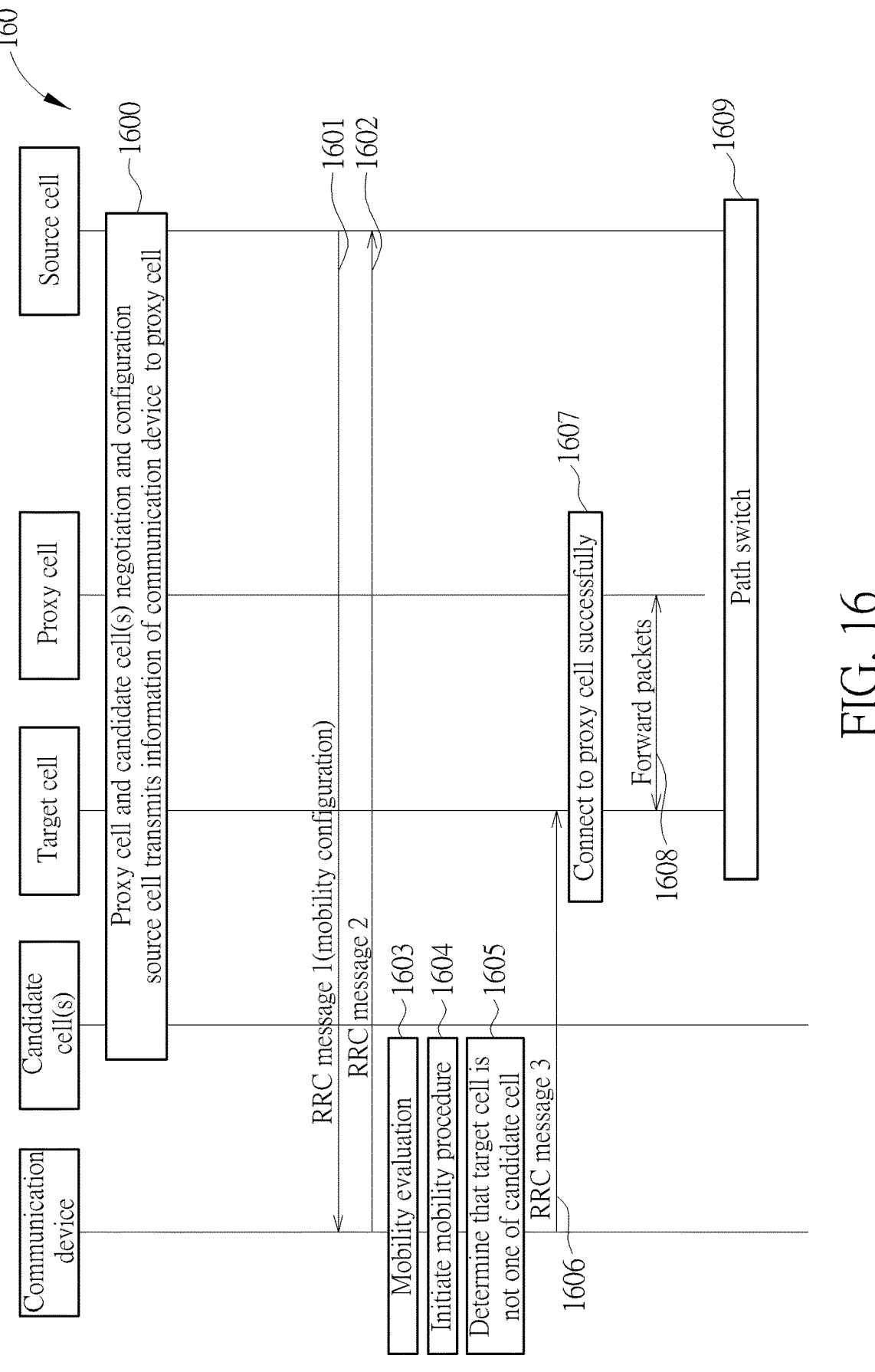
FIG. 16 is a schematic flowchart of a process according to an example of the present invention.

FIG. 16 is a schematic flowchart of a process 160 according to an example of the present invention, where network entities such as a communication device, at least one candidate cell, a target cell, a proxy cell and a source cell are shown. The operations, messages, configurations of the network entities are simplified for ease of the illustration, but are not limited herein. The process 160 may be applied to the wireless communication system 10 in FIG. 1 or the wireless communication system 20 in FIG. 2. The steps 1600-1604 are similar to the steps 1400-1404, and are not repeated herein. At step 1605, the communication device determines that the target cell is the not one of the at least one candidate cell according to the first RRC message. At step 1606, the communication device transmits a third RRC message (e.g., RRC message 3) to the target cell in response to the determination. The third RRC message may further include at least one of a source cell PCI, information of the source cell, a C-RNTI associated with the communication device provided by the source cell, and an authentication information associated with the communication device. The steps 1607-1609 are similar to the steps 1407-1409, and are not repeated herein.

Figure 17:
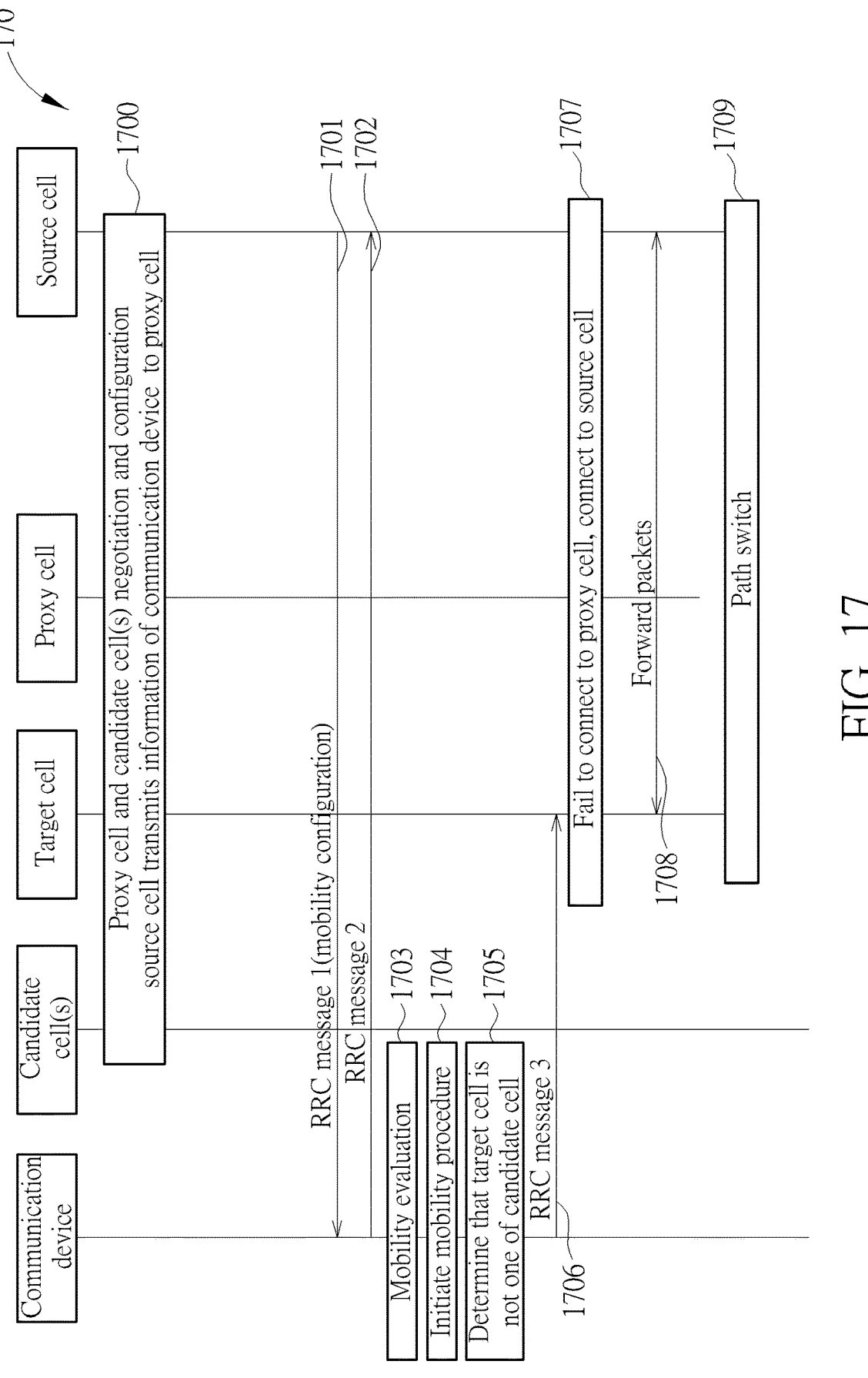
FIG. 17 is a schematic flowchart of a process according to an example of the present invention.

FIG. 17 is a schematic flowchart of a process 170 according to an example of the present invention, where network entities such as a communication device, at least one candidate cell, a target cell, a proxy cell and a source cell are shown. The operations, messages, configurations of the network entities are simplified for ease of the illustration, but are not limited herein. The process 170 may be applied to the wireless communication system 10 in FIG. 1 or the wireless communication system 20 in FIG. 2. The steps 1700-1706 are similar to the steps 1600-1606, and are not repeated herein. The steps 1707-1709 are similar to the steps 1507-1509, and are not repeated herein.

Figure 18:
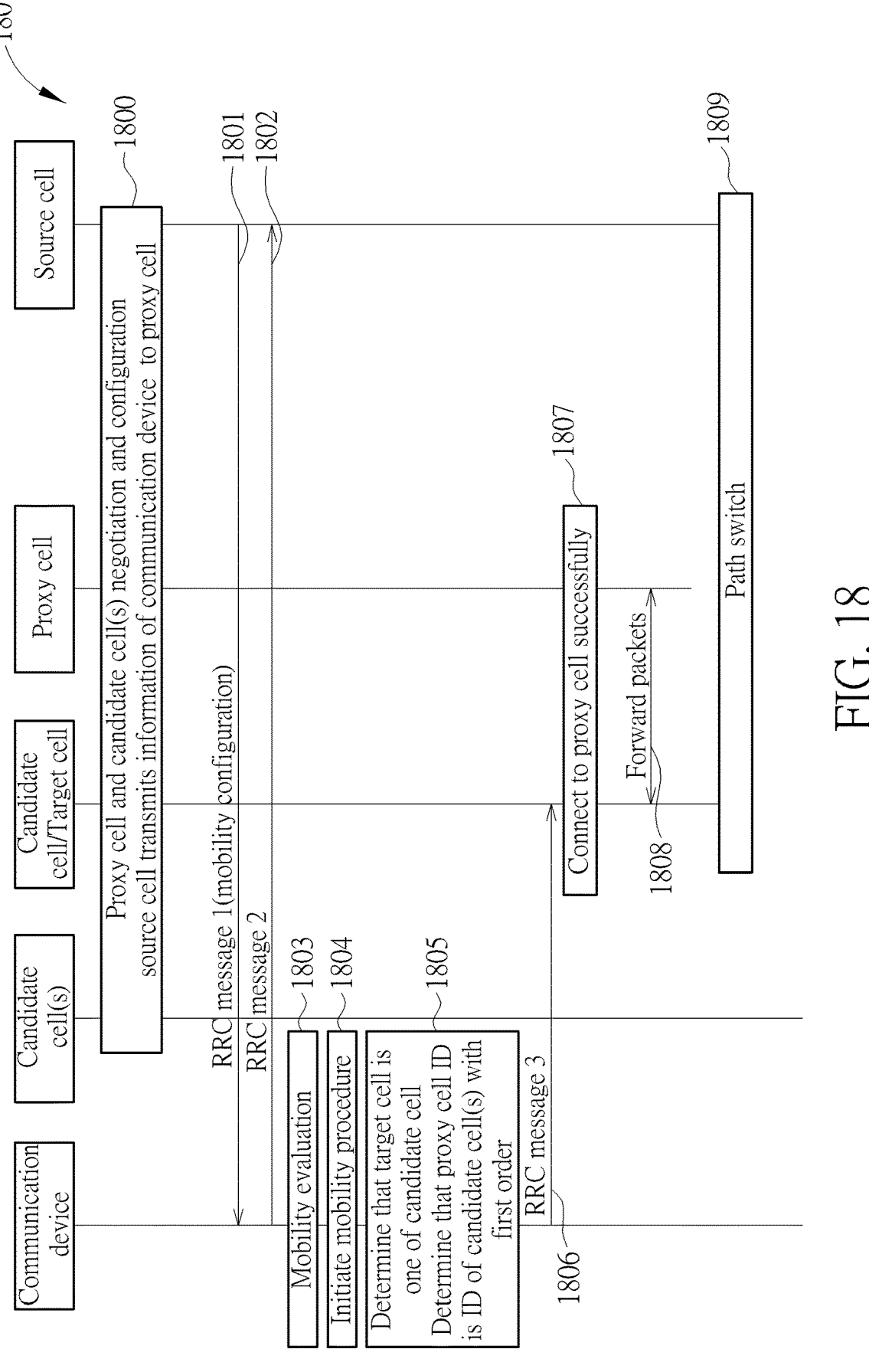
FIG. 18 is a schematic flowchart of a process according to an example of the present invention.

FIG. 18 is a schematic flowchart of a process 180 according to an example of the present invention, where network entities such as a communication device, at least one candidate cell, a target cell, a proxy cell and a source cell are shown. The operations, messages, configurations of the network entities are simplified for ease of the illustration, but are not limited herein. The process 180 may be applied to the wireless communication system 10 in FIG. 1 or the wireless communication system 20 in FIG. 2. At step 1800, the source cell performs negotiation and configuration with the proxy cell and the at least one candidate cell. At step 1801, the source cell transmits a first RRC message (e.g., RRC message 1) to the communication device. The first RRC message further includes an indication for applying a proxy cell for the mobility procedure. At step 1802, the communication device transmits a second RRC message (e.g., RRC message 2) to the source cell in response to the receiving of the first RRC message. At step 1803, the communication device performs a mobility evaluation according to the first RRC message and determines a target cell. At step 1804, the communication device initiates a mobility procedure according to the mobility evaluation. At step 1805, the communication device determines that the target cell is one of the at least one candidate cell and determines that a proxy cell ID is an ID of the at least one candidate cell with a first order according to the first RRC message. That is, the communication device apply the ID of the at least one candidate cell with the first order as the proxy cell ID.

At step 1806, the communication device transmits a third RRC message (e.g., RRC message 3) to the target cell in response to the determination. The third RRC message may further include at least one of a source cell PCI, a C-RNTI associated with the communication device provided by the source cell, and an authentication information associated with the communication device. At step 1807, the target cell (i.e., the one of the at least one candidate cell) connects to the proxy cell successfully. At step 1808, the target cell requests the proxy cell for the information of the communication device and the proxy cell forwards information of the communication device including data packets associated with the communication device to the target cell. At step 1809, the target cell, the proxy cell and the source cell perform a path switch with involving CN entities.

Figure 19:
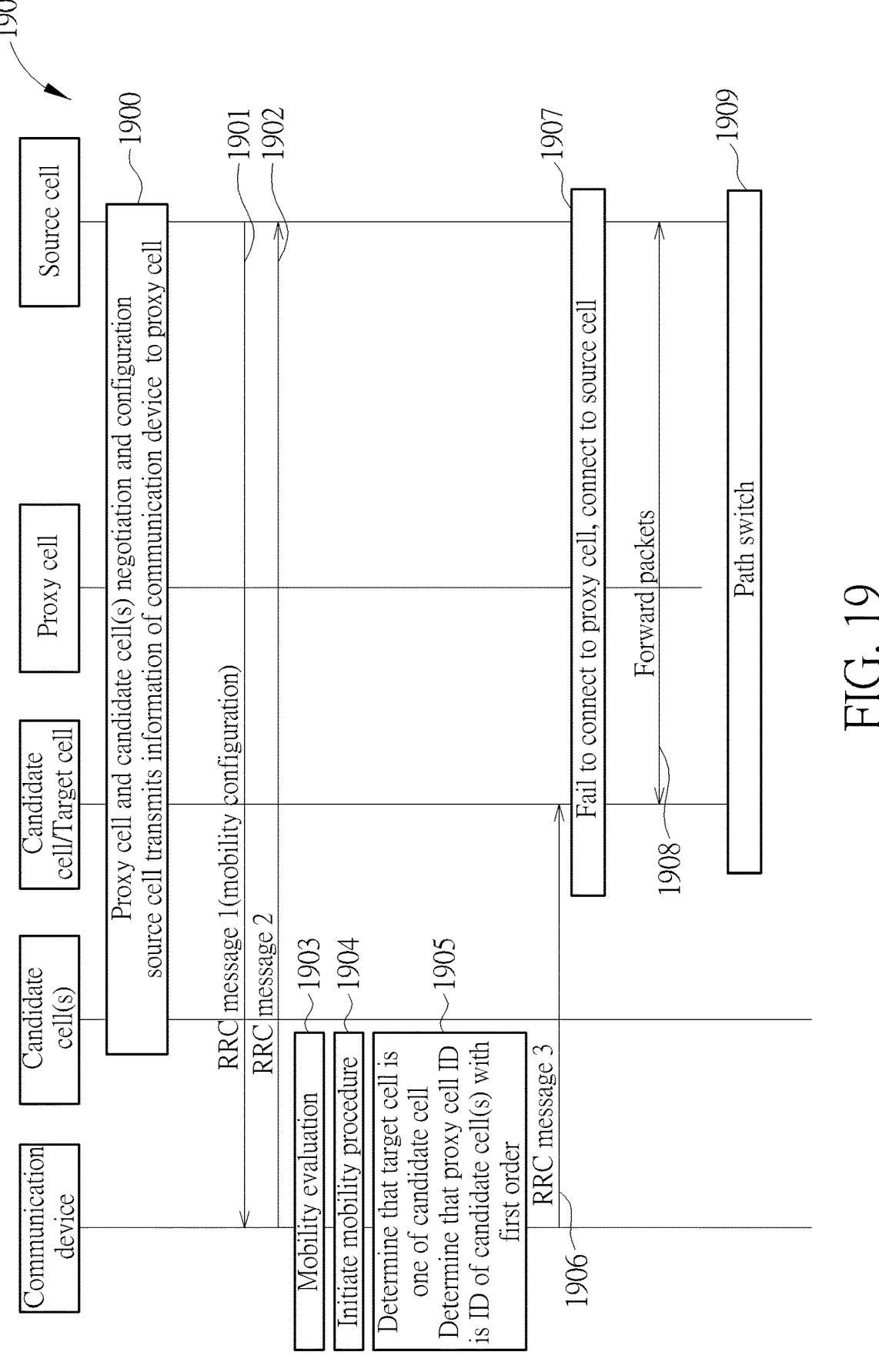
FIG. 19 is a schematic flowchart of a process according to an example of the present invention.

FIG. 19 is a schematic flowchart of a process 190 according to an example of the present invention, where network entities such as a communication device, at least one candidate cell, a target cell, a proxy cell and a source cell are shown. The operations, messages, configurations of the network entities are simplified for ease of the illustration, but are not limited herein. The process 190 may be applied to the wireless communication system 10 in FIG. 1 or the wireless communication system 20 in FIG. 2. The steps 1900-1906 are similar to the steps 1800-1806, and are not repeated herein. At step 1907, the target cell (i.e., the one of the at least one candidate cell) fails to connect to the proxy cell and connects to the source cell. At step 1908, the target cell requests the source cell for the information of the communication device and the source cell forwards information of the communication device including data packets associated with the communication device to the target cell. At step 1909, the target cell and the source cell perform a path switch with involving CN entities.

Figure 20:
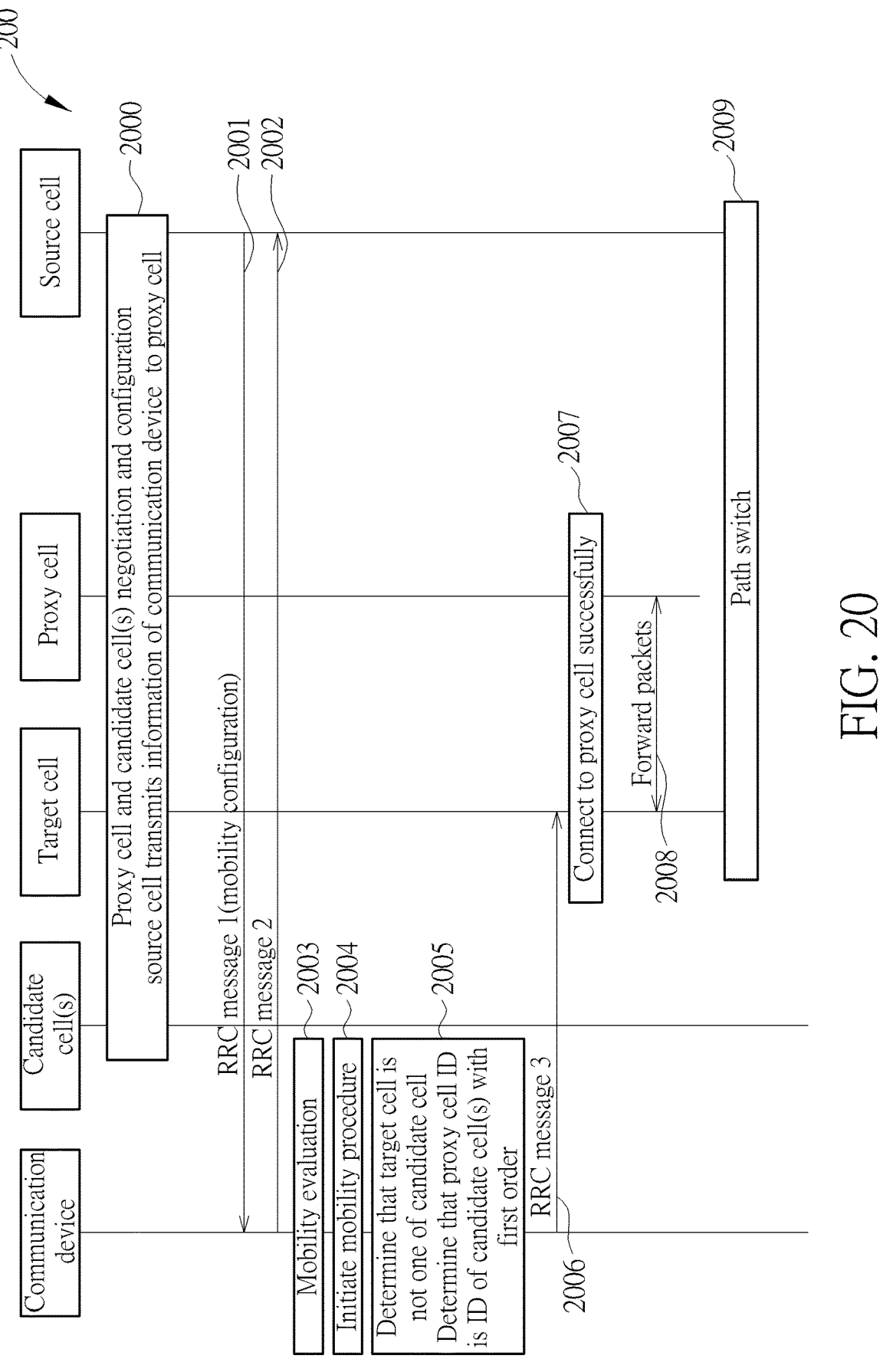
FIG. 20 is a schematic flowchart of a process according to an example of the present invention.

FIG. 20 is a schematic flowchart of a process 200 according to an example of the present invention, where network entities such as a communication device, at least one candidate cell, a target cell, a proxy cell and a source cell are shown. The operations, messages, configurations of the network entities are simplified for ease of the illustration, but are not limited herein. The process 200 may be applied to the wireless communication system 10 in FIG. 1 or the wireless communication system 20 in FIG. 2. The steps 2000-2004 are similar to the steps 1900-1904, and are not repeated herein. At step 2005, the communication device determines that the target cell is the not one of the at least one candidate cell and determines that a proxy cell ID is an ID of the at least one candidate cell with first order according to the first RRC message. That is, the communication device apply the ID of the at least one candidate cell with the first order as the proxy cell ID. At step 2006, the communication device transmits a third RRC message (e.g., RRC message 3) to the target cell. The third RRC message may further include at least one of a source cell PCI, information of the source cell, a C-RNTI associated with the communication device provided by the source cell, and an authentication information associated with the communication device. The steps 2007-2009 are similar to the steps 1807-1809, and are not repeated herein.

Figure 21:
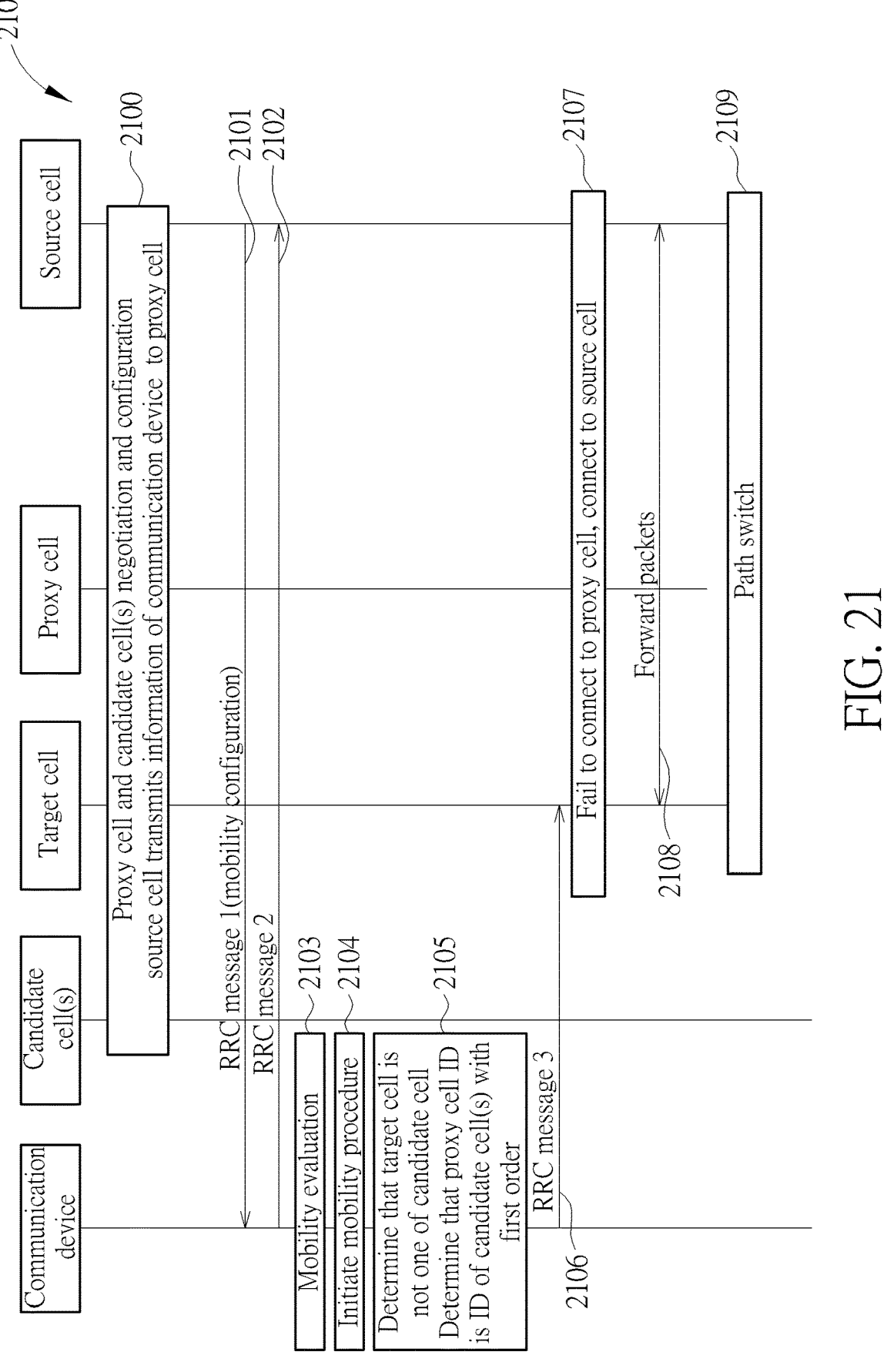
FIG. 21 is a schematic flowchart of a process according to an example of the present invention.

FIG. 21 is a schematic flowchart of a process 210 according to an example of the present invention, where network entities such as a communication device, at least one candidate cell, a target cell, a proxy cell and a source cell are shown. The operations, messages, configurations of the network entities are simplified for ease of the illustration, but are not limited herein. The process 210 may be applied to the wireless communication system 10 in FIG. 1 or the wireless communication system 20 in FIG. 2. The steps 2100-2106 are similar to the steps 2000-2006, and are not repeated herein. The steps 2107-2109 are similar to the steps 1907-1909, and are not repeated herein.

Figure 22:
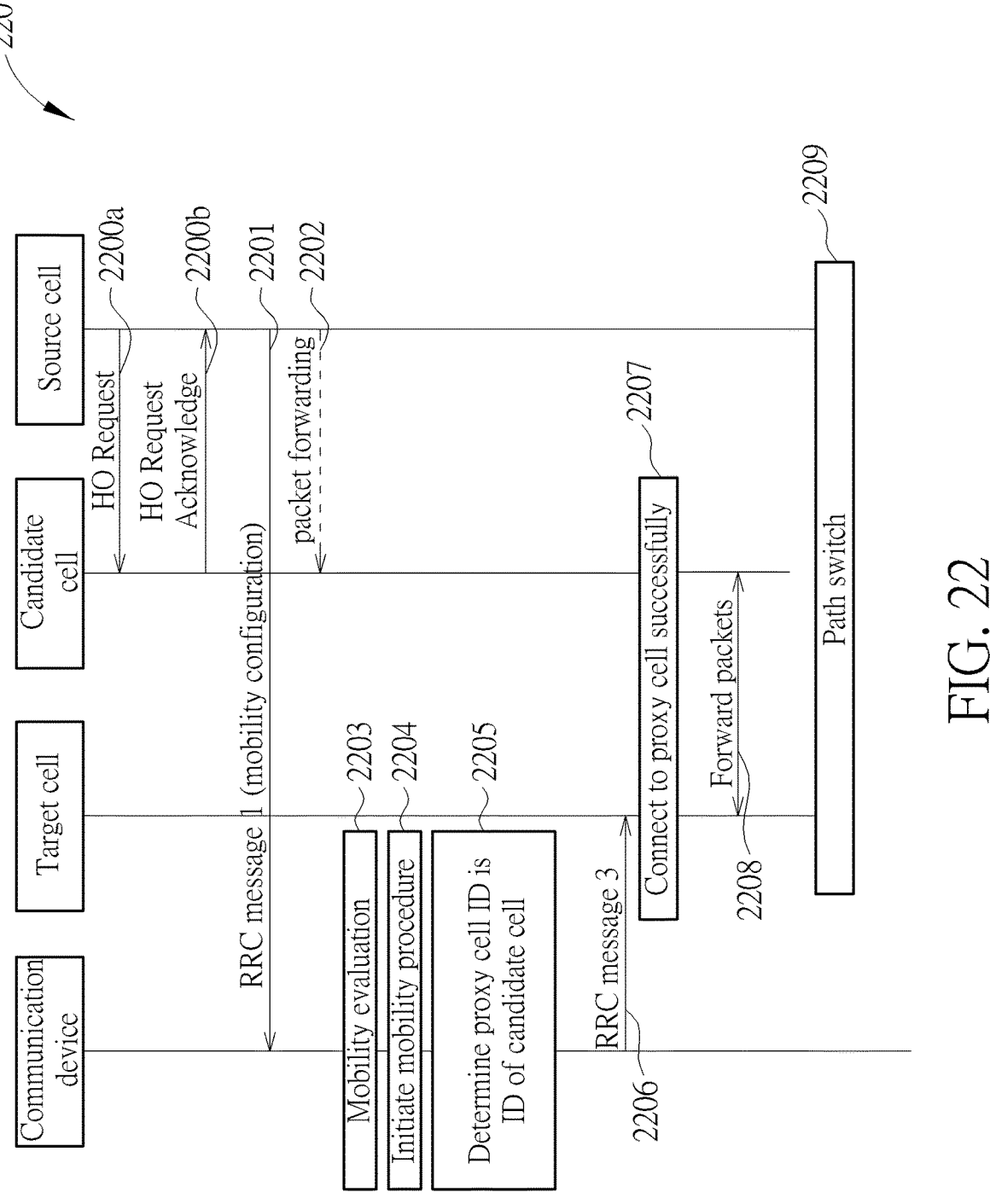
FIG. 22 is a schematic flowchart of a process according to an example of the present invention.

FIG. 22 is a schematic flowchart of a process 220 according to an example of the present invention, where network entities such as a communication device, a target cell, a candidate cell and a source cell are shown. The operations, messages, configurations of the network entities are simplified for ease of the illustration, but are not limited herein. The process 220 may be applied to the wireless communication system 10 in FIG. 1 or the wireless communication system 20 in FIG. 2. At step 2200a, the source cell transmits a handover request message to a candidate cell. At step 2200b, the source cell receives a handover request acknowledge message from the candidate cell in response to the handover request message. At step 2201, the source cell transmits a first RRC message (e.g., RRC message 1)

including a mobility configuration to the communication device. The first RRC message includes an indication for applying a proxy cell in the mobility procedure. At step 2202, the source cell may perform a first (e.g., early) packet forwarding to the candidate cell. At step 2203, the communication device performs a mobility evaluation according to the first RRC message and determines a target cell. At step 2204, the communication device initiates a mobility procedure according to the mobility evaluation. At step 2205, the communication device determines that a proxy cell ID is an ID of the candidate cell. That is, the communication device applies the ID of the candidate cell as the proxy cell ID.

At step 2206, the communication device transmits a second RRC message (e.g., RRC message 3) to the target cell in response to the determination. The third RRC message may further include at least one of a source cell PCI, information of the source cell, a C-RNTI associated with the communication device provided by the source cell, and an authentication information associated with the communication device. At step 2207, the target cell connects to the proxy cell (i.e., the candidate cell) successfully. At step 2208, the target cell requests the proxy cell for the information of the communication device and the proxy cell forwards information of the communication device including data packets associated with the communication device to the target cell. At step 2209, the target cell and the source cell perform a path switch with involving CN entities.

Figure 23:
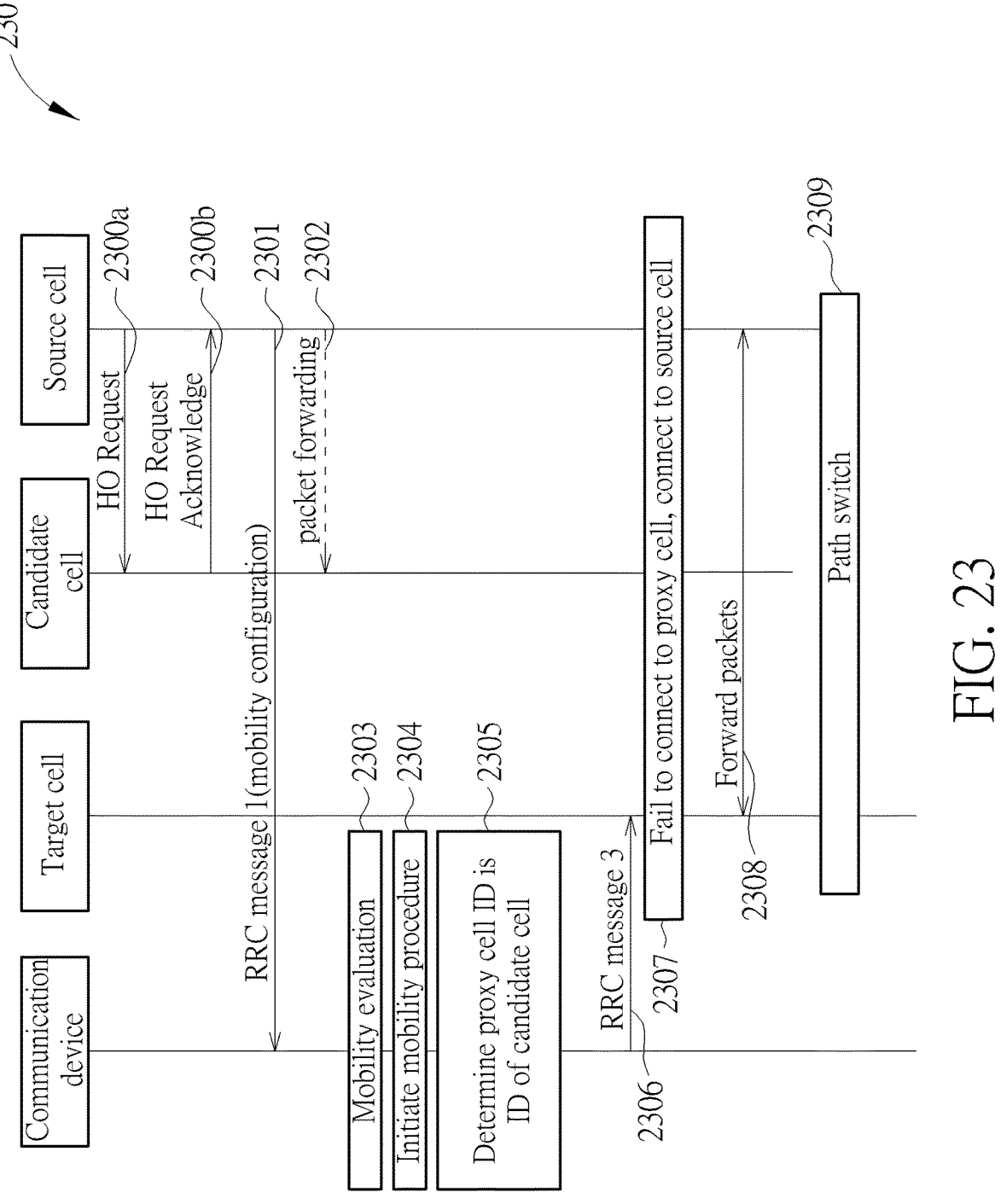
FIG. 23 is a schematic flowchart of a process according to an example of the present invention.

FIG. 23 is a schematic flowchart of a process 230 according to an example of the present invention, where network entities such as a communication device, a target cell, a candidate cell and a source cell are shown. The operations, messages, configurations of the network entities are simplified for ease of the illustration, but are not limited herein. The process 230 may be applied to the wireless communication 10 in FIG. 1 or the wireless communication system 20 in FIG. 2. The steps 2300-2306 are similar to the steps 2200a, 2200b, 2201-2206, and are not repeated herein. At step 2307, the target cell (i.e., the one of the at least one candidate cell) fails to connect to the candidate cell (i.e., proxy cell) and connects to the source cell. At step 2308, the target cell requests the source cell for the information of the communication device and the source cell forwards information of the communication device including data packets associated with the communication device to the target cell. At step 2309, the target cell and the source cell perform a path switch with involving CN entities.

In the above examples, the term of "determine" may be replaced by "obtain", "select", "generate", "calculate" or "compute". The term of "obtain" may be replaced by "generate", "calculate" or "compute". The term of "according to" may be replaced by "via" or "by using".

It should be noted that although the above examples are illustrated to clarify the related operations of corresponding processes. The examples can be combined and/or modified arbitrarily according to system requirements and/or design considerations.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 30.

Examples of the hardware may include analog circuit(s), digital circuit(s) and/or mixed circuit(s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module (s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 30.

To sum up, the present invention provides a method and related communication device for handling mobility. The target cell may retrieve the data of the communication device from the proxy cell, and may not need to retrieve the data of the communication device from the source cell. In addition, the communication device may provide assistant information for the target cell to distinguish the target cell and the source cell. As a result, the problem regarding the transmission delay and the cell ID reusing can be solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling mobility, comprising:

at least one storage device; and at least one processing circuit, coupled to the at least one storage device, wherein the at least one storage device stores instructions, and the at least one processing circuit is configured to execute the instructions of:

receiving a mobility configuration comprising information of a proxy cell and at least one candidate cell from a source cell of a source base station (BS);

performing a mobility procedure to change the source cell to a first target cell according to the mobility configuration;

performing a determination on whether the first target cell is one of the at least one candidate cell according to the mobility configuration;

determining that an ID of the proxy cell is an ID of the at least one candidate cell; and transmitting a first connection establishment message, comprised of the ID of the proxy cell, to the first target cell according to the determination.

2. The communication device of claim 1, wherein the first connection establishment message comprises at least one of a physical cell ID (PCI) of the source cell, information of the source cell and an ID of the proxy cell.

3. The communication device of claim 2, wherein the information of the source cell comprises a non-terrestrial network (NTN) mobility indication, a public land mobile network (PLMN) ID of the source cell, a global cell ID (GCI) of the source cell, or a frequency ID of the source cell.

4. The communication device of claim 2, wherein the first connection establishment message comprises the PCI of the source cell, and the determination comprises that the first target cell is the one of the at least one candidate cell.

5. The communication device of claim 4, wherein the first connection establishment message comprises the ID of the proxy cell, and the ID of the proxy cell is one of at least one cell ID comprised in the at least one candidate cell and is indicated by the source cell by an indicator comprised in the mobility configuration.

6. The communication device of claim 2, wherein the first connection establishment message comprises the ID of the proxy cell, the PCI of the source cell and the information of the source cell, and the determination comprises that the first target cell is not the one of the at least one candidate cell.

7. The communication device of claim 6, wherein the communication device determines that the ID of the proxy cell is an ID of the at least one candidate cell with a first order.

8. The communication device of claim 1, wherein the first connection establishment message comprises a cell radio network temporary identifier (C-RNTI) of the communication device in the source cell.

9. The communication device of claim 1, wherein the first connection establishment message comprises an authentication information of the communication device which is configured by the source cell in the mobility configuration.

10. The communication device of claim 9, wherein the authentication information of the communication device comprises a message authentication code-integrity (MAC-I) or a part of the MAC-I.

11. The communication device of claim 2, wherein the instruction further comprising:

determining a second target cell according to the mobility configuration, when determining that transmitting the first connection establishment message is failed; and transmitting a second connection establishment message to the second target cell.

12. The communication device of claim 11, wherein the second connection establishment message comprises the ID of the proxy cell, the PCI of the source cell and the information of the source cell.

13. The communication device of claim 1, wherein the mobility configuration is transmitted by a radio resource control (RRC) message.

14. The communication device of claim 1, wherein the mobility configuration comprises configuration of the at least one candidate cell.

15. The communication device of claim 1, wherein the information of the proxy cell comprises an indication indicating that the proxy cell is supported for the communication device.

16. The communication device of claim 1, wherein the source cell comprises a source cell of the communication device.

17. The communication device of claim 1, wherein the source cell comprises a serving cell of the communication device.

\* \* \* \* \*